(12) United States Patent
Oki et al.

(10) Patent No.: US 7,457,240 B2
(45) Date of Patent: Nov. 25, 2008

(54) NODE, PACKET COMMUNICATION NETWORK, PACKET COMMUNICATION METHOD, AND PROGRAM

(75) Inventors: Eiji Oki, Tokyo (JP); Daisaku Shimazaki, Tokyo (JP); Naoaki Yamanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1127 days.

(21) Appl. No.: 10/335,344

(22) Filed: Dec. 31, 2002

(65) Prior Publication Data

US 2003/0135645 A1 Jul. 17, 2003

(30) Foreign Application Priority Data

Jan. 15, 2002 (JP) ............................. 2002-006168
Jan. 15, 2002 (JP) ............................. 2002-006194

(51) Int. Cl.
*H04L 12/28* (2006.01)
(52) U.S. Cl. .................. 370/230; 370/238; 370/395.21; 370/395.52
(58) Field of Classification Search ................ 370/230, 370/236, 238, 252, 253, 401, 402, 238.1, 370/395.21
See application file for complete search history.

(56) References Cited

U.S. PATENT DOCUMENTS

| | | | | |
|---|---|---|---|---|
| 5,825,772 A * | 10/1998 | Dobbins et al. | ............. | 370/396 |
| 6,480,468 B1 | 11/2002 | Kishigami et al. | ....... | 370/230.1 |
| 6,708,000 B1 * | 3/2004 | Nishi et al. | ..................... | 398/1 |
| 7,136,357 B2 * | 11/2006 | Soumiya et al. | ............. | 370/236 |
| 2003/0118027 A1 * | 6/2003 | Lee et al. | ................ | 370/395.21 |
| 2004/0091198 A1 * | 5/2004 | Graves | ........................ | 385/16 |

FOREIGN PATENT DOCUMENTS

| | | |
|---|---|---|
| EP | 1 152 631 A2 | 11/2001 |
| JP | 10-065687 | 3/1998 |
| JP | 10-242989 | 9/1998 |
| JP | 10-285168 | 10/1998 |
| JP | 10-327163 | 12/1998 |
| JP | 11-098183 | 4/1999 |
| JP | 11-98183 | 4/1999 |

(Continued)

OTHER PUBLICATIONS

J. Moy; "OSPF Version 2"; IETF RFC 2328; pp. 1-244; Apr. 1998.

(Continued)

*Primary Examiner*—Chi H. Pham
*Assistant Examiner*—Shick Hom
(74) *Attorney, Agent, or Firm*—Harness, Dickey & Pierce, P.L.C.

(57) ABSTRACT

The present invention relates to a node, a packet communication network, and a packet communication method and program. The node of the present invention is one which includes a section which advertises to other nodes link state information which indicates the state of links which are connected to this node, a section which establishes a packet forwarding path according to the link state information which is included in the advertisement by the advertisement section, and a traffic observation section which observes the traffic and outputs its observations as traffic observation results.

69 Claims, 27 Drawing Sheets

FOREIGN PATENT DOCUMENTS

| | | |
|---|---|---|
| JP | 2000-078188 | 3/2000 |
| JP | 2000-138688 | 5/2000 |
| JP | 2001-045053 | 2/2001 |
| JP | 2002-026990 | 1/2002 |
| WO | WO-01/69862 | 9/2001 |

OTHER PUBLICATIONS

R. Coltun; "The OSPF Opaque LSA Option"; IETF RFC 2370; pp. 1-15; Jul. 1998.

A. Banerjee et al.; "Generalized Multiprotocol Label Switching: An Overview of Routing and Management Enhancements"; IEEE Communications Magazine; p. 144-150; Jan. 2001.

A. Banerjee et al.; "Generalized Multiprotocol Label Switching: An Overview of Signaling Enhancements and Recovery Techniques"; IEEE Communications Magazine; pp. 144-151; Jul. 2001.

K. Kompella et al.; "OSPF Extentions in Support of Generalized MPLS"; Internet Draft, draft-ietf-ccamp-ospf-gmpls-extensions-08. txt (work in progress); pp. 1-12; Aug. 2002.

E. Oki et al.; "Multi-Layer Traffic Engineering in Photonic IP Networks"; The Institute of Electronics; Information and Communication Engineers; Technical Report of IEICE, PS2001-102; pp. 43-46; Jan. 18, 2002.

E. Oki et al.; "A Heuristic Multi-Layer Optimum Topology Design Scheme Based on Traffic Measurement for IP + Photonic Networks"; Proc. of Optical Fiber Communications (OFC) 2002; pp. 104-105; Mar. 2002.

E. Oki et al.; "Multi-Layer Traffic Engineering in GMPLS Networks"; The Institute of Electronics; Information and Communication Engineers; B-7-118; p. 345; Mar. 2001.

K. Sato et al.; "GMPLS-Based Photonic Multilayer Router (Hiraki Router) Architecture: An Overview of Traffic Engineering and Signaling Technology"; IEEE Communications Magazine; vol. 40, No. 3, pp. 96-101; Mar. 2002.

N. Yamanaka et al.; "Traffic engineering and signaling technologies in photonic-GMPLS-router networks"; 2002 Workshop on High Performance Switching and Routing; pp. 142-146; May 2002.

G. Apostolopoulos et al.. "RFC2676: QoS Routing Mechanisms and OSPF Extensions", Aug. 1999.

* cited by examiner

FIG. 2

LINK STATE DATABASE

LINK (1, 2), CAPACITY, RESERVED BANDWIDTH, FIXED COST, TRAFFIC INFORMATION
LINK (1, 4), CAPACITY, RESERVED BANDWIDTH, FIXED COST, TRAFFIC INFORMATION
LINK (4, 5), CAPACITY, RESERVED BANDWIDTH, FIXED COST, TRAFFIC INFORMATION
LINK (2, 5), CAPACITY, RESERVED BANDWIDTH, FIXED COST, TRAFFIC INFORMATION
...

PRIOR ART

*PRIOR ART*

FIG. 11

LINK STATE DATABASE

LINK (1, 2), CAPACITY, RESERVED BANDWIDTH, FIXED COST
LINK (1, 4), CAPACITY, RESERVED BANDWIDTH, FIXED COST
LINK (4, 5), CAPACITY, RESERVED BANDWIDTH, FIXED COST
LINK (2, 5), CAPACITY, RESERVED BANDWIDTH, FIXED COST
...

BEFORE CUT THROUGH

AFTER CUT THROUGH

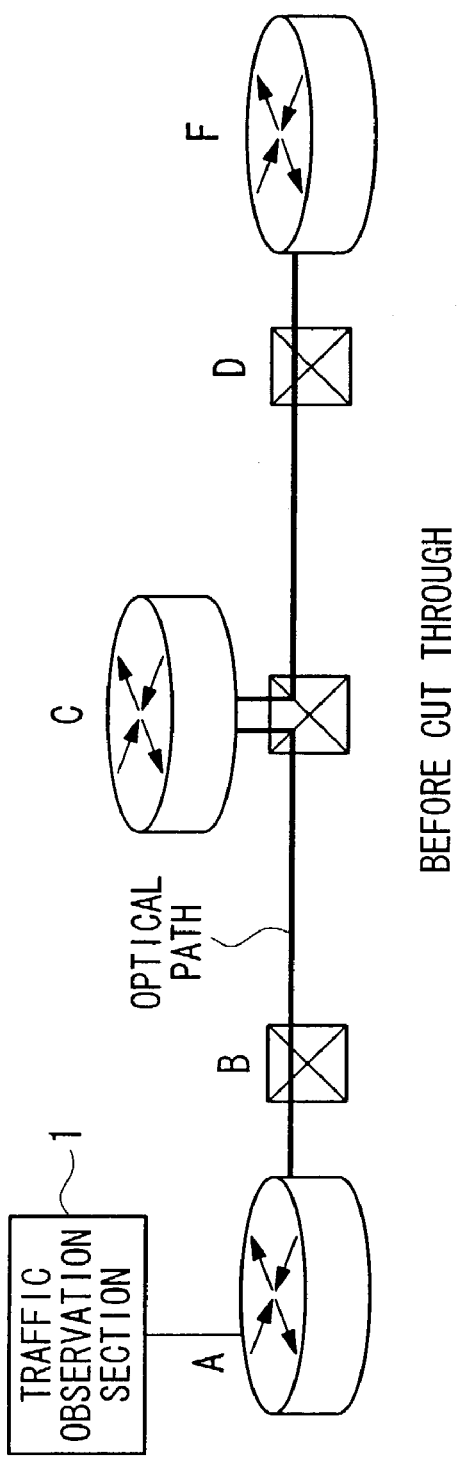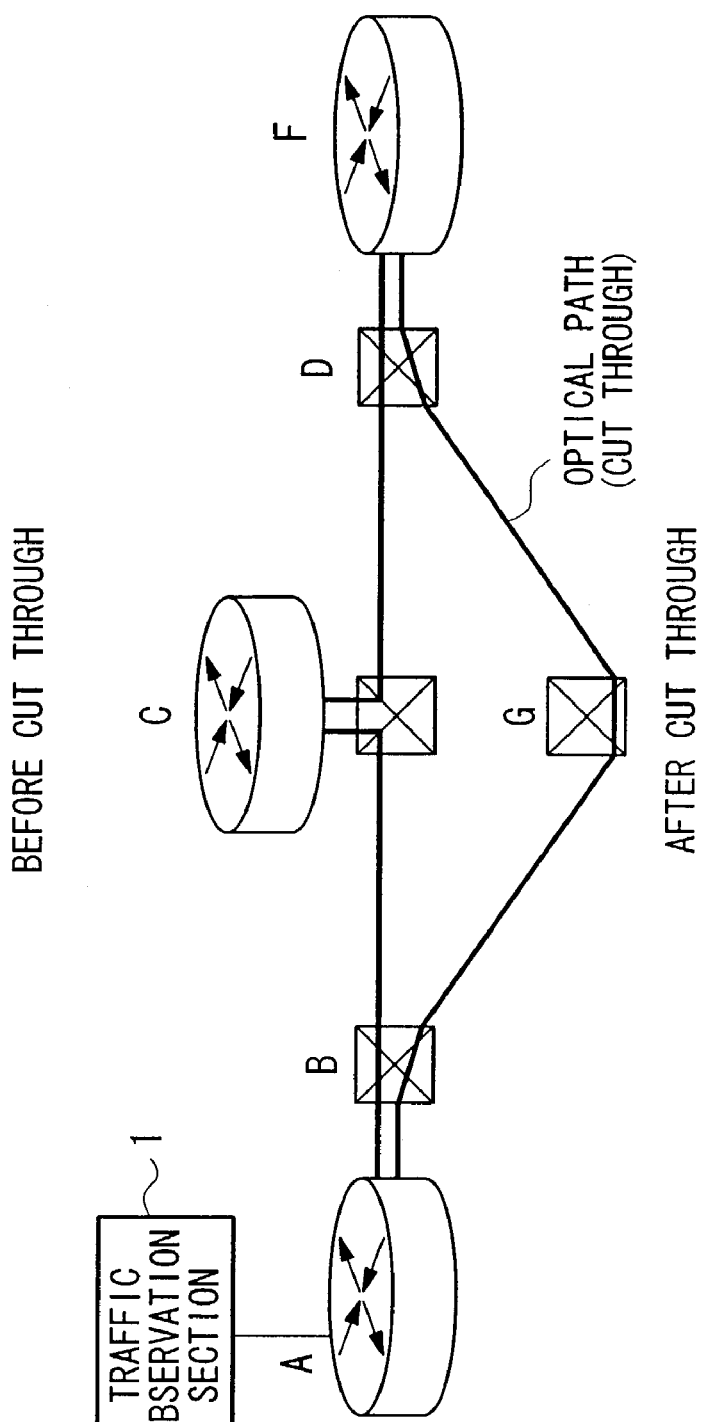

BEFORE CUT THROUGH

AFTER CUT THROUGH

NODE, PACKET COMMUNICATION NETWORK, PACKET COMMUNICATION METHOD, AND PROGRAM

BACKGROUND OF THE INVENTION

1. Field of the Invention

This application is based on patent applications Nos. 2002-006194 and 2002-006168 filed in Japan, the contents of which are incorporated herein by reference.

The present invention is taken advantage of in a packet communication network in which, at each node, link state information which indicates the state of the links by which other nodes are connected to the current node is advertised to the other nodes, and, in each node, a link cost is determined according to the link state information which is included in these advertisements, and a path is calculated according to this link cost which has thus been determined.

Furthermore, the present invention is taken advantage of in a packet communication network which combines packet switch processing in which packet switching is performed by IP address units, and wavelength path switch processing in which wavelength path switching is performed by wavelength units.

2. Description of the Related Art

FIG. 9 shows a packet communication network which is provided with a link state type routing protocol. FIG. 10 shows the structure of a node in a conventional communication network. FIG. 11 shows an example of a link state database (DB) in a conventional communication network.

Open Shortest Path First (OSPF) is one routing protocol in an Internet Protocol (IP) communication network (refer to J. Moy, "OSPF Version 2", RFC 2328, 1998). In OSPF, a node which is connected to a link manages the state of the link, and the state of this link is advertised within the network as link state information. A protocol which is performed for routing based upon this type of link state is termed a link state type routing protocol.

Various parameters may be used as the state of the link, such as, as shown in FIG. 11, the presence or absence of a link between the two nodes, link capacity, the bandwidth which is reserved for the link, fixed cost, or the like. For example, the fixed cost is set so as to be proportional to the distance of the link. In OSPF, it is possible to advertise this link state information (refer to J. Moy, "OSPF Version 2", RFC 2328, 1998, and R. Coltun, "The OSPF Opaque LSA Option", RFC 2370, 1998).

As shown in FIG. 10, each node comprises a routing control section 6. This routing control section 6 comprises a link state database 4, a flooding section 10, a path calculation section 3, and a routing table 7. The link state of the current node is notified to the link state database 4, and the link state database 4 is updated thereby. This updated link state is advertised via the flooding section 10 to the other nodes which are connected to the current node as link state information.

Furthermore, along with updating the link state database 4 of the current node with link state information which has been advertised from other nodes, the link state information is further advertised towards yet other nodes. By advertising this link state information, the link state information is propagated to all the nodes within the communication network, and it is possible to ensure that each node maintains the same link state database 4.

Path calculation based upon the link state database 4 is performed by the path calculation section 3, and the routing table 7 is updated.

Here, by way of example, a method for calculating the path for the packets of the best effort class will be discussed. It is possible to calculate the bandwidth which is not reserved for the link (the non reserved bandwidth) by calculating the difference between the capacity of the link and the reserved bandwidth. If the non reserved bandwidth of a link is less than or equal to a threshold value which is set in advance, this link is excluded from the candidates of the link used in path calculation, since the non reserved bandwidth is insufficient. From the candidates for the link to be used, the fixed cost is taken as the distance of the link, and the shortest path from the current node to each arrival node is selected. Based upon the result thereof, the destination of the current hop is determined, and is reflected in the routing table 7. This method is one which aims at the beneficial result of minimizing this packet forwarding delay time between the ends of the link, under the condition that there is a constraint upon the packet forwarding delay time between the ends of the link. The delay time exerts an influence upon the bandwidth which can be utilized and upon the distance of the link.

Furthermore, another method for calculating the path for the packets of the best effort class will be discussed. It is possible to calculate the bandwidth which is not reserved for the link (the non reserved bandwidth) from the capacity of the link and the reserved bandwidth. The reciprocal of the non reserved bandwidth is taken as the distance of the link, and the shortest path from the current node to each arrival node is selected. Based upon the result thereof, the destination of the current hop is determined, and is reflected in the routing table 7. This method is one which aims at the beneficial result of minimizing the packet forwarding delay time between the ends of the link.

However, it may happen that the reserved bandwidth or the fixed cost does not reflect the actual state of the link. In other words, the problem may arise that it is not possible to utilize the network resources efficiently, because the amount of traffic which is being transmitted upon the link is always varying, and the reserved bandwidth or the fixed cost does not necessarily reflect the situation with the link which is being used at the moment.

This problem will be further explained with reference to the conventional packet communication network which is shown in FIGS. 25 through 27. FIG. 25 is a figure showing a conventional packet communication network. FIGS. 26A through 26C are figures showing a classification of switching functions. FIG. 27 is a block structure diagram of a router upon this conventional packet communication network.

As shown in FIG. 25, nodes having three types of switching function are disposed upon the communication network, and these nodes are connected together by optical fibers. FIG. 26A shows a node which is endowed with a packet-based switching function (PSC: Packet Switch Capable). This will herein be termed a router. FIG. 26B shows a node which is endowed with a wavelength-based switching function (LSC: Lambda Switch Capable). This will herein be termed an optical cross-connect. FIG. 26C shows a node which is endowed both with a packet-based switching function and also a wavelength-based switching function (PSC+LSC). This will herein be termed an optical router. With such an optical router, depending upon its setting, either only wavelength-based switching is performed, or both wavelength-based switching and also packet-based switching are performed.

In FIG. 25, optical paths are established between the router A and the optical router C, between the optical router C and the router F, and between the optical router C and the router E. These optical paths are terminated by the routers. Optical path do not terminate at the optical cross-connects B, D, and G, and they only perform wavelength-based switching.

The flow of packets from the router A to the router F will now be considered. As one scheme for forwarding the packets, there is a scheme of establishing an electrical path which operates between grounds utilizing electrical levels. Furthermore, there is a scheme of establishing a routing up to the destination by referring to the routing tables which are held in the routers, based upon the header information in the packets, rather than by setting an electrical path between grounds. Both the conventional techniques and the technique of the present invention can be applied both to a scheme in which an electrical path is established, and to a scheme in which no electrical path is established. Herein, the scheme will be discussed in which an electrical path is established between grounds.

The electrical path from the router A to the router F is terminated by the router A and the router F, and is not terminated by the optical router C. This electrical path from the router A to the router F uses two optical paths and arrives at the router F by way of the optical cross-connect B->the optical router C->the optical cross-connect D. Furthermore, the electrical path from the router A to the router E is terminated by the router A and the router E, and is not terminated by the optical router C. This electrical path from the router A to the router E uses two optical paths and arrives at the router E by way of the optical cross-connect B->the optical router C->the optical cross-connects B and G. Furthermore, an electrical path between A and C is established for traffic between the grounds A and C. The optical path between the nodes A and C includes the electrical paths between the grounds A and F, between the grounds A and C, and between the grounds A and E.

With a conventional packet communication network, in order to change the establishment of the optical paths and the electrical paths as in FIG. 25, the maintainer issues commands to an integrated control section 20A for establishing such changes of the electrical paths or of the optical paths. By doing this, establishment change signals are transmitted from the integrated control section 20A to each of the nodes, and each of the nodes starts the establishment of an electrical path or of an optical path, according to these signals.

As shown in FIG. 27, a path change request reception section 7 receives a request for establishment change of an electrical path or of an optical path from the integrated control section 20A, and, based upon the information in the link state database 4A, a path which satisfies the path change request by the path calculation section 3A is sought out, and, if such a path has been found, a signal for establishing an electrical path or an optical path is dispatched by a path establishment section 5A to the downstream nodes.

Updating of the link state database 4A is performed according to the following Open Shortest Path First (OSPF), which is one routing protocol for a communication network which employs Internet Protocol (IP). With OSPF, a node which is connected to a link manages the state of the link, and advertises the state of this link over the network (refer to J. Moy, "OSPF Version 2", RFC 2328, 1998, and R. Coltun, "The OSPF Opaque LSA Option", RFC 2370, 1998). Furthermore, there is a type of OSPF in which OSPF upon an IP network has been extended to the optical layer (refer to A. Banerjee, J. Drake, J. P. Lang, B. Turner, K. Kompella, and Y. Rekhter, "Generalized Multiprotocol Label Switching: An Overview of Routing and Management Enhancements", IEEE Commun. Mag., pp. 144-150, January 2001).

However, the timing at which such an electrical path or optical path is established is entrusted to the maintainer, and, since the amount of traffic which is transferred over the electrical path or the optical path is always varying, there is the problem that network resources may not always be efficiently utilized in accordance with the variations in the traffic.

In other words, the maintainer decides whether or not the data which is to transmitted from now on is single shot type data for which the amount of data is relatively small, or is burst type data for which the amount of data is relatively large, and establishes an electrical path or an optical path based upon the results of this decision. Thus, in the case of single shot type data, the IP addresses of the packets are electrically read by each router, and the next stage router is selected and forwarding is performed according to their IP addresses. Furthermore, in the case of burst type data, a cut through path is established between optical cross-connects or optical routers, and the packets are all forwarded together upon this cut through path without their IP addresses being electrically read.

It is anticipated that, by changing between an electrical path or an optical path according to this type of command from the maintainer, network resources will be efficiently taken advantage of by forwarding burst type data of which the quantity is relatively great at high speed, but it would be possible to anticipate even more efficient utilization of network resources, if it were possible to perform changing between an electrical path and an optical path automatically, based upon the results of actual observation of the amount of traffic which was varying moment by moment. However, no such proposal has as yet been presented.

SUMMARY OF THE INVENTION

The present invention was made as a result of the above described type of background, and-its primary objective is to provide a node, a packet communication network, and a packet communication method, program, and recording medium which can select a path according to a desired purpose, and can efficiently take advantage of network resources, by applying the current traffic information for the links to the link state type routing protocol, and by selecting a path that reflects the state of the links which are used.

The present invention comprises a traffic observation section in a node, and traffic information which has been obtained as a result of observation is appended to link state information, so that the traffic information is reflected in the selection of a path.

In order to reflect the traffic information in the link state information, for example, the link state database may be updated by using a method of advertising the link state information by flooding. Alternatively, the traffic information for each node may be transmitted to a traffic information collection and distribution device which manages the traffic information collectively, so that the traffic information collection and distribution device collects the traffic information from each node, and distributes the traffic information to each node. The link state databases are updated based on the traffic information which has been distributed to each node.

By doing this, the traffic information for the current link is applied to the link state type routing protocol, so that, by selecting a path which reflects the state of usage of the links, it is possible to select a path according to a desired purpose, and it is possible to take advantage of network resources efficiently.

In other words, a first aspect of the present invention is a node, comprising: an advertisement section which advertises link state information which indicates the state of links which are connected to the current node, to other nodes; and an establishment section which establishes a packet forwarding path according to the link state information which is included in the advertisement from the advertisement section.

Here, in the present invention, there may be included a traffic observation section, and the advertisement section may comprise a section which appends the results of traffic observation which have been observed by the traffic observation section to the link state information, and the establishment section which establishes the packet forwarding path may comprise: a calculation section which calculates a dynamic link cost according to traffic information which is included in the advertisement from the advertisement section; and a section which calculates a path according to the dynamic link cost which has been calculated by the calculation section.

A second aspect of the present invention is a packet communication network which includes a node according to the present invention.

Alternatively, the second aspect of the present invention is a packet communication network which comprises: a node which includes an advertisement section which advertises link state information which indicates the state of links which are connected to the current node, to other nodes; and an establishment section which establishes a packet forwarding path according to the link state information which is included in the advertisement from the advertisement section.

Here, in the present invention, the node comprises a traffic observation section, and a traffic information collection and distribution section is further provided which collects the results of the traffic observation from each node and distributes the results of the traffic observation to predetermined nodes, and the traffic observation section comprises a section which transmits the results of the traffic observation to the traffic information collection and distribution section, and the establishment section which establishes the packet forwarding path comprises: a calculation section which calculates a dynamic link cost according to the traffic information which has been distributed by the traffic information collection and distribution section; and a section which calculates a path according to the dynamic link cost which has been calculated by the calculation section.

In this case, the first aspect of the present invention is a node which comprises: an advertisement section which advertises link state information which indicates the state of links which are connected to the current node, to other nodes; and an establishment section which establishes a packet forwarding path according to the link state information which is included in an advertisement from the advertisement section.

Here, in the present invention, there may be included a traffic observation section, and the traffic observation section may include a section which transmits the results of the traffic observation to a traffic information collection and distribution section which collects the results of traffic observation from each node and distributes the results of the traffic observation results to predetermined nodes; while the establishment section which establishes the packet forwarding path may include: a calculation section which calculates a dynamic link cost based on the traffic information which has been distributed by the traffic information collection and distribution section; and a section which calculates a path according to the dynamic link cost which has been calculated by the calculation section.

This link state information, for example, may include path capacity, reserved bandwidth, and a fixed link cost which is allocated to the path in advance; and the setting section which sets the dynamic link cost, for example, may be implemented by including a section which calculates the dynamic link cost according to the path capacity and the reserved bandwidth and the fixed link cost which is given in advance for the path which are included in the link state information, and the traffic information.

Furthermore, the traffic observation section may, for example, include a section which observes the amount of data which passes per unit time. Or, the traffic observation section may include a section which observes the number of packets passing per unit time. Or, the traffic observation section may include a section which observes packet delay time per unit time.

A third aspect of the present invention is a packet communication method in which, at each of the nodes which are provided in a packet communication network: an advertisement containing link state information which indicates the state of links which are connected to the current node is advertised to other nodes; and a packet forwarding path is established according to the link state information contained in the advertisement.

Here, in the present invention, in each of the nodes, the traffic is observed and the results of traffic observation which have been observed by the traffic observation are appended to the link state information; a dynamic link cost is calculated according to the traffic information which is contained in the advertisement; and a path is calculated according to the dynamic link cost which has been calculated.

Or, the third aspect of the present invention may be a packet communication method in which, in each of the nodes which is provided within the packet communication network: an advertisement containing link state information which indicates the state of links which are connected to the current node is advertised to other nodes; and a packet forwarding path is established according to the link state information contained in the advertisement.

Here, in the node of the present invention, the traffic is observed; the results of the traffic observation are transmitted to a traffic information collection and distribution section which collects the results of the traffic observation for each node and distributes the results of the traffic observation to predetermined nodes; a dynamic link cost is calculated based on the traffic information which is distributed by the traffic information collection and distribution section; and a path is calculated according to the dynamic link cost which has been calculated.

The link state information, for example, may include path capacity, reserved bandwidth, and a fixed link cost which is allocated to the path in advance; and, for example, the dynamic link cost may be calculated according to the path capacity and the reserved bandwidth and the fixed link cost which is given in advance for the path which are included in the link state information, and the traffic information.

A fourth aspect of the present invention is a program which, by being installed upon an information processing device, can implement upon the information processing device, as a function which corresponds to a node which is provided upon a packet communication network: an advertisement function of advertising link state information which indicates the state of links which are connected to the current node to other nodes; and an establishment function of establishing a packet forwarding path according to the link state information contained in the advertisement from the advertisement function.

Here, with the present invention, a traffic observation function is implemented, and: as the advertisement function, a function is implemented of appending the results of traffic observation which have been observed by the traffic observation function to the link state information, while, as the establishment function which establishes the packet forwarding path, there are implemented a calculation function of calculating a dynamic link cost according to the traffic information which is included in the advertisement from the advertisement function, and a function of calculating a path according to the dynamic link cost which has been calculated by the calculation function.

Or, the fourth aspect of the present invention may be a program which, by being installed upon an information processing device, can implement upon the information processing device a function which corresponds to a node which includes an advertisement function of advertising link state information which indicates the state of links which are connected to the current node to other nodes; and an establishment function of establishing a packet forwarding path according to the link state information contained in the advertisement from the advertisement function.

Here, with the present invention, a traffic observation function is implemented, and: as the traffic observation function, a function is implemented of transmitting the results of traffic observation to a traffic information collection and distribution function which collects the results of the traffic observation from each node, and which distributes the results of the traffic observation to predetermined nodes; while, as the establishment function of establishing the packet forwarding path, there are implemented a calculation function of calculating a dynamic link cost based on the traffic information which has been distributed by the traffic information collection and distribution function, and a function of calculating a path according to the dynamic link cost which has been calculated by the calculation function.

This link state information, for example, may include path capacity, reserved bandwidth, and a fixed link cost which is allocated to the path in advance; and, for example, as a setting function for setting the dynamic link cost, a function may be implemented of calculating the dynamic link cost according to the path capacity and the reserved bandwidth and the fixed link cost which is given in advance for the path which are included in the link state information, and the traffic information.

Furthermore, the traffic observation section may, for example, implement a function of observing the amount of data which passes per unit time. Or, the traffic observation section may implement a function of observing the number of packets passing per unit time. Or, the traffic observation section may implement a function of observing packet delay time per unit time.

A fifth aspect of the present invention is a recording medium upon which is recorded a program according to the present invention which can be read by the information processing device. By recording the program according to the present invention upon a recording medium, it is possible to install the program according to the present invention upon the information processing device, using this recording medium. Or it is also possible to install the program according to the present invention directly upon the information processing device over a network from a server upon which the program according to the present invention is stored.

By doing this, using an information processing device such as a computer device or the like, the current traffic information for the links is applied to the link state type routing protocol, and, by selecting a path which reflects the state of use of the links, it is possible to select the path according to a desired purpose, and accordingly it is possible to take advantage of network resources efficiently.

As described above, according to the present invention, the current traffic information for the links is applied to the link state type routing protocol, and, by selecting a path which reflects the state of use of the links, it is possible to select the path according to a desired purpose, and accordingly it is possible to take advantage of network resources efficiently.

Furthermore, another objective of the present invention is to provide a packet communication network, a node, and a packet communication method and program and recording medium which can efficiently take advantage of network resources, by automatically selecting a path which reflects the actual state of utilization of an electrical path or an optical path.

The most outstanding feature of the present invention is that the traffic is observed by a router, and that changeover of the setting of an electrical path or of an optical path is requested by taking the traffic information which has been obtained by this observation as a trigger.

For example, a node which changes over the setting of an electrical path or an optical path may perform observation of the traffic, and may request the changeover of the setting of the electrical path or the optical path based upon the traffic information which has been obtained by this observation process. Or, alternatively, a relay node may perform the observation of the traffic, and may notify traffic information which has been obtained by this observation process to a node which changes over the setting of the electrical path or the optical path, so that the node which has been notified may request the changeover of the setting of the electrical path or the optical path. Or, alternatively, a method may be employed in which each router individually performs observation of the traffic, and in which the traffic information which has been obtained by each router is advertised as the link state, and the link state database is updated by flooding, so that a request may be issued for the changeover of the setting of the electrical path or the optical path according to the contents of this update.

By doing this, it is possible more efficiently to take advantage of network resources, as compared with a conventional packet communication network in which changeover of the setting of an electrical path or an optical path was requested according to the decision of a maintainer which did not observe the current traffic information upon the electrical path or the optical path, since it is possible automatically to select a path which reflects the actual circumstances of use of the electrical path or the optical path.

In other words, a sixth aspect of the present invention is a packet communication network comprising: a first node which comprises a section which performs IP address-based packet switching; a second node which comprises a section which performs wavelength-based path switching; and a third node which comprises both a section which performs IP address-based packet switching and a section which performs wavelength-based path switching, and in which a relay node which is the second node or the third node is provided between a dispatch side node which is the first node or the third node, and an arrival side node which is the first node or the third node; and in which switch processing either by IP address-based packet switching or wavelength-based path switching is applied to one path between the dispatch side node and the arrival side node; and the dispatch side node comprises a setting section which sets the switch processing.

Here, in the present invention, a traffic observation section is provided in the dispatch side node, and the setting section comprises a section which selects one or the other of the types of switch processing according to the results of the traffic observation from the traffic observation section.

In this case, a seventh aspect of the present invention is a node in which switch processing either by IP address-based packet switching or wavelength-based path switching is applied to one path between the current node and the arrival side node, and in which there is provided a section for setting the switch processing.

Here, in the present invention, a traffic observation section is provided, and the setting section comprises a section which selects one or the other of the types of switch processing according to the result of the traffic observation from the traffic observation section.

Or, a sixth aspect of the present invention is a packet communication network which comprises: a first node which comprises a section which performs IP address-based packet switching; a second node which comprises a section which performs wavelength-based path switching; and a third node which comprises both a section which performs IP address-based packet switching and a section which performs wavelength-based path switching; and in which a relay node which is the second node or the third node is provided between a dispatch side node which is the first node or the third node, and an arrival side node which is the first node or the third node; and in which switch processing either by IP address-based packet switching or wavelength-based path switching is applied to one path between the dispatch side node and the arrival side node; and the dispatch side node comprises a section which sets the switch processing.

Here, with the present invention, the relay node includes a traffic observation section, and a notification section which notifies the results of traffic observation from the traffic observation section to the dispatch side node, and the setting section comprises a section which selects one or the other of the types of switch processing according to the results of the traffic observation which are included in the notifications from the notification section.

In this case, a seventh aspect of the present invention is a node which is provided in a path between the dispatch side node and the arrival side node, and which comprises a traffic observation section, and a notification section which notifies the results of traffic observation from the traffic observation section to the dispatch side node.

Furthermore, the seventh aspect of the present invention is a node in which switch processing is applied to one path between the current node and the arrival side node, either by IP address-based packet switching, or by wavelength-based path switching, and in which there is provided a setting section which sets the switch processing.

Here, with the present invention, the setting section comprises a section which selects one or the other of the types of the switch processing according to the results of the traffic observation which are included in the notifications from other nodes.

Or, the sixth aspect of the present invention is a packet communication network which comprises: a first node which comprises a section which performs IP address-based packet switching; a second node which comprises a section which performs wavelength-based path switching; and a third node which comprises both a section which performs IP address-based packet switching and a section which performs wavelength-based path switching; wherein a relay node which is the second node or the third node is provided between a dispatch side node which is the first node or the third node, and an arrival side node which is the first node or the third node; switch processing either by IP address-based packet switching or wavelength-based path switching is applied to one path between the dispatch side node and the arrival side node; and the dispatch side node comprises a section which sets the switch processing.

Here, with the present invention, each of the dispatch side node, the relay node, and the arrival side node comprises a traffic observation section and an advertisement section which advertises the results of the traffic observation from the traffic observation section to other nodes; and the setting section comprises a section which selects one or the other of the types of switch processing according to the results of the traffic observation which are included in the advertisement from the advertisement section.

In this case, the seventh aspect of the present invention is a node which comprises a traffic observation section and an advertisement section which advertises the results of traffic observation from the traffic observation section to other nodes; and wherein, upon one path between the dispatch side node and the arrival side node, switch processing is applied either by IP address-based packet switching, or by wavelength-based path switching; and further comprising a selection section which selects one or other of the types of switch processing, according to the results of the traffic observation which are included in the advertisement from the advertisement section, when the current node is the dispatch side node.

It is desirable for the advertisement section to comprise a section which writes the results of the traffic observation into a portion of the link information for OSPF (Open Shortest Path First).

It is desirable for the selection section to comprise a section which, when the results of the traffic observation have exceeded a threshold value, if the switch processing is IP address-based packet switching, changing over the switch processing to wavelength-based path switching.

The traffic observation section may be implemented by comprising a section which observes amount of data which passes per unit time; or by comprising a section which observes number of packets passing per unit time; or by comprising a section which observes packet delay time per unit time.

The eighth aspect of the present invention is a packet communication method in which a first node which performs IP address-based packet switching, a second node which performs wavelength-based path switching, and a third node which performs both IP address-based packet switching and wavelength-based path switching are disposed in a packet communication network; a relay node which is the second node or the third node is provided between a dispatch side node which is the first node or the third node, and an arrival side node which is the first node or the third node; and the dispatch side node sets switch processing either by IP address-based packet switching or wavelength-based path switching is applied to one path between the dispatch side node and the arrival side node.

Here, with the present invention, the traffic is observed by the dispatch side node, and one or the other of the types of switch processing is selected according to the results of the traffic observation obtained by the observation process.

Or, with the present invention, the traffic is observed by the relay node, the results of the traffic observation obtained by the observation process are notified to the dispatch side node, and the dispatch side node selects one or the other of the types of switch processing according to the notifications.

Or, with the present invention, the traffic is observed by each of the dispatch side node, the relay node, and the arrival side node, the results of the traffic observation obtained by the observation process are advertised to the other nodes, and the dispatch side node selects one or the other of the types of switch processing according to the advertisement.

The ninth aspect of the present invention is a program which, by being installed upon an information processing device, implements upon the information processing device, as a function which corresponds to a node which is provided upon a packet communication network, switch processing either by IP address-based packet switching or wavelength-based path switching is applied to one path between the current node and the arrival side node, and a setting function of setting the switch processing is implemented.

Here, with the present invention, a traffic observation function is implemented, and, as the setting function, a function is implemented of selecting the one or the other type of switch processing, according to the traffic observation results from the traffic observation function.

Or, the ninth aspect of the present invention is a program which, by being installed upon an information processing device, implements upon the information processing device, as a function which corresponds to a node which is provided upon a packet communication network, a traffic observation function, and a function of notifying the results of traffic observation from the traffic observation function to the dispatch side node.

Or, the ninth aspect of the present invention is a program which, by being installed upon an information processing device, implements upon the information processing device, as a function which corresponds to a node which is provided upon a packet communication network, switch processing either by IP address-based packet switching or wavelength-based path switching is applied to one path between the current node and the arrival side node, and a setting function of setting the switch processing is implemented.

Here, with the present invention, as the setting function, a function is implemented of selecting the one or the other type of switch processing, according to the results of the traffic observation which are included in notifications from other nodes.

Or, the ninth aspect of the present invention is a program which, by being installed upon an information processing device, implements upon the information processing device, as a function which corresponds to a node which is provided upon a packet communication network, a traffic observation function, and an advertisement function of advertising the results of the traffic observation from the traffic observation function to other nodes; and switch processing either by IP address-based packet switching or wavelength-based path switching is applied to one path between the dispatch side node and the arrival side node, and, if the current node is the dispatch side node, a selection function of selecting one or the other of the types of switch processing according to the results of the traffic observation which are included in the advertisement from the advertisement function.

As the advertisement function, it is desirable to implement a function of writing the results of the traffic observation into a portion of the link information for OSPF.

As the selection function, it is desirable to implement a function of, if the switch processing is IP address-based packet switching, when the results of the traffic observation have exceeded a threshold value, changing over the switch processing to wavelength-based path switching.

Furthermore, as the traffic observation function, it is desirable to implement a function of observing the amount of data which passes per unit time.

Or, as the traffic observation function, it is desirable to implement a function of observing the number of packets passing per unit time.

Or, as the traffic observation function, it is desirable to implement a function of observing the packet delay time per unit time.

A tenth aspect of the present invention is a recording medium upon which is recorded a program according to the present invention which is capable of being read by the information processing device. By recording the program according to the present invention upon such a recording medium according to the present invention, it is possible to install the program according to the present invention upon the information processing device by utilizing this recording medium. Or, it is also possible to install the program according to the present invention directly upon the information processing device via a network from a server upon which the program according to the present information is stored.

By doing this, it is possible to implement a packet communication network and a node by the use of an information processing device such as a computer device or the like which can take advantage of network resources efficiently, by automatically selecting a path which reflects the actual state of use of an electrical path or of an optical path.

As has been explained above, according to the present invention, it is possible to take advantage of network resources efficiently, by automatically selecting a path which reflects the actual state of use of an electrical path or of an optical path.

BRIEF DESCRIPTION OF THE DRAWINGS

FIG. 2 is a figure showing a link state database of this first preferred embodiment.

FIG. 11 is a figure showing a conventional link state database.

FIGS. 14A and 14B are figures showing a cut through example (the second portion thereof) in the fifth preferred embodiment.

DETAILED DESCRIPTION OF THE PREFERRED EMBODIMENTS

Figure 1:
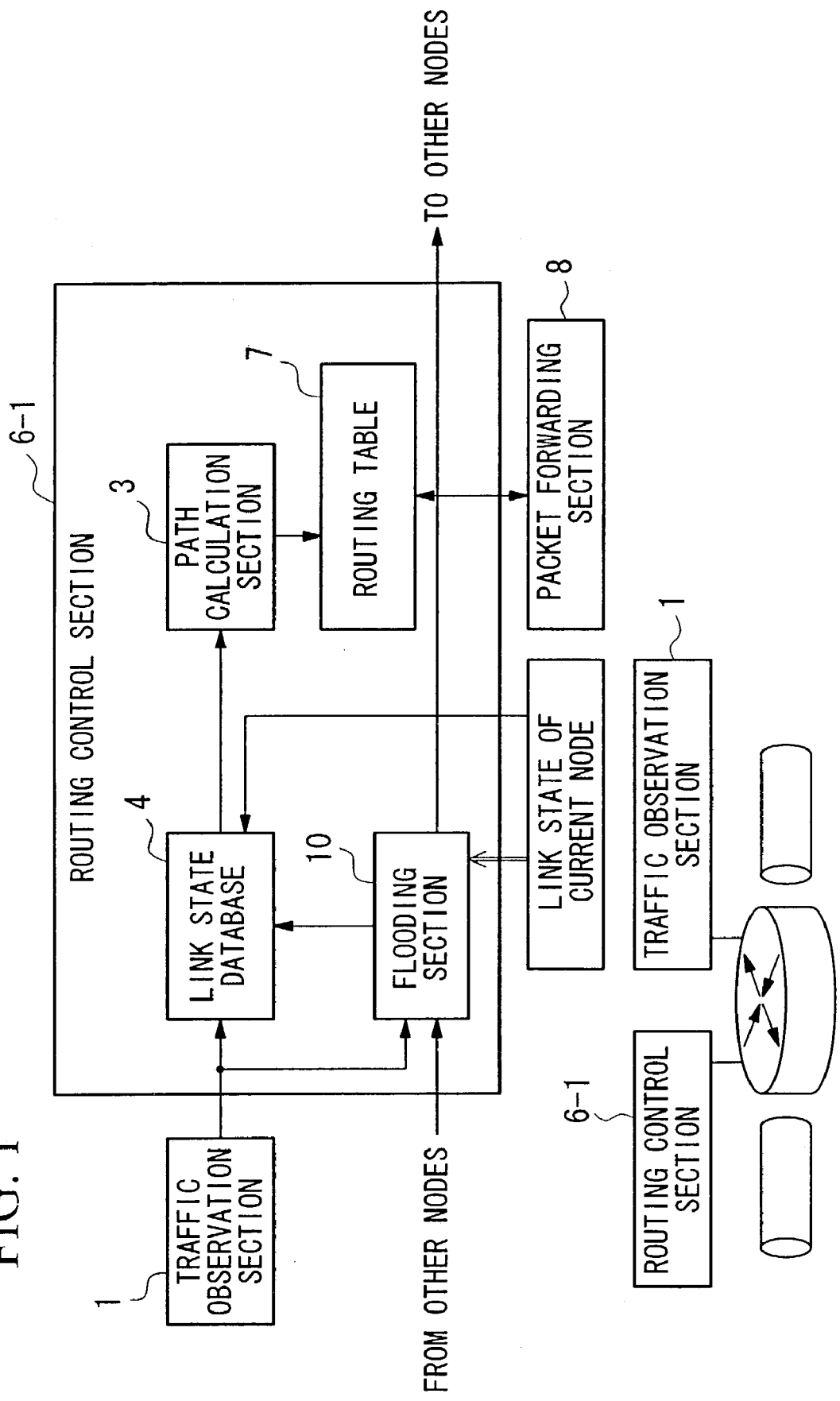
FIG. 1 is a block structure diagram showing the structure of a node according to the first preferred embodiment of the present invention.
Figure 3:
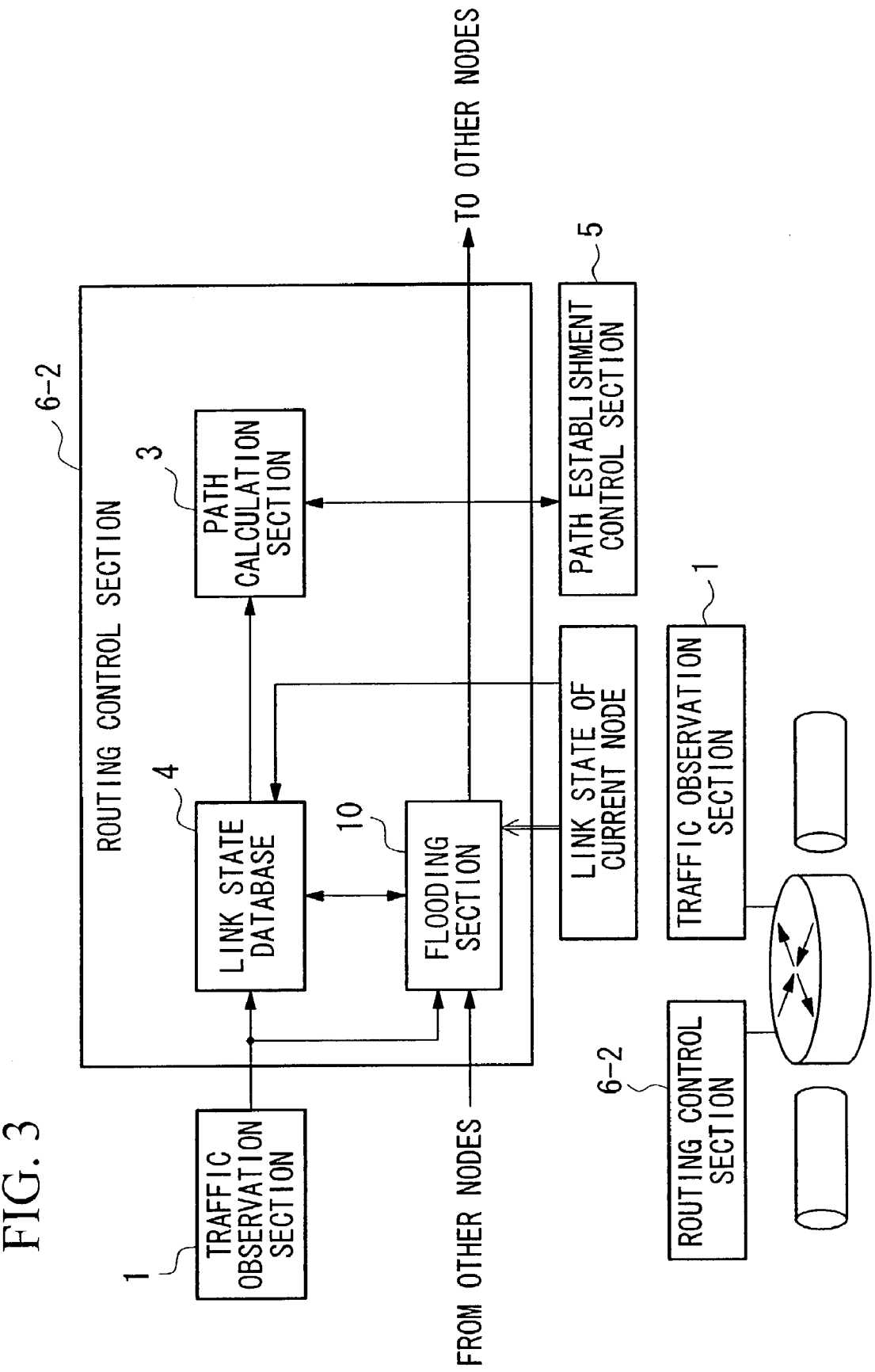
FIG. 3 is a block structure diagram showing the structure of a node of the second preferred embodiment.
Figure 4:
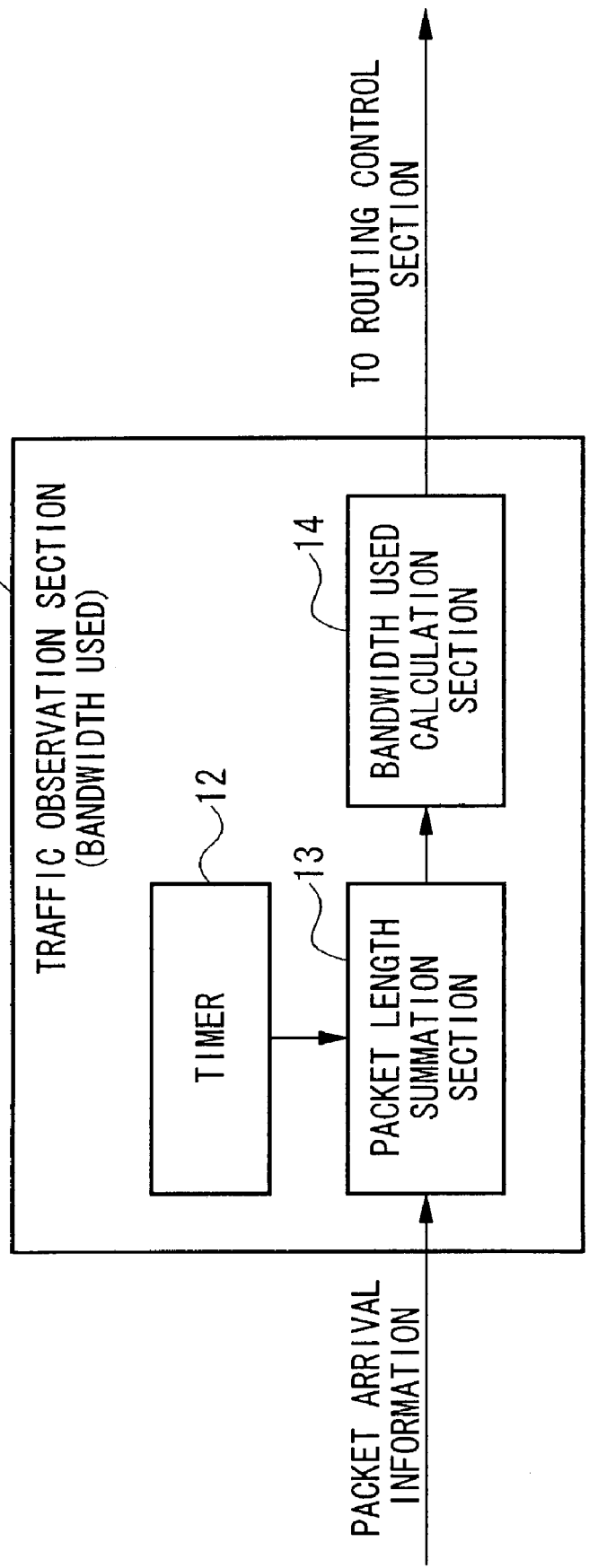
FIG. 4 is a block structure diagram showing a traffic observation section of the third preferred embodiment.
Figure 5:
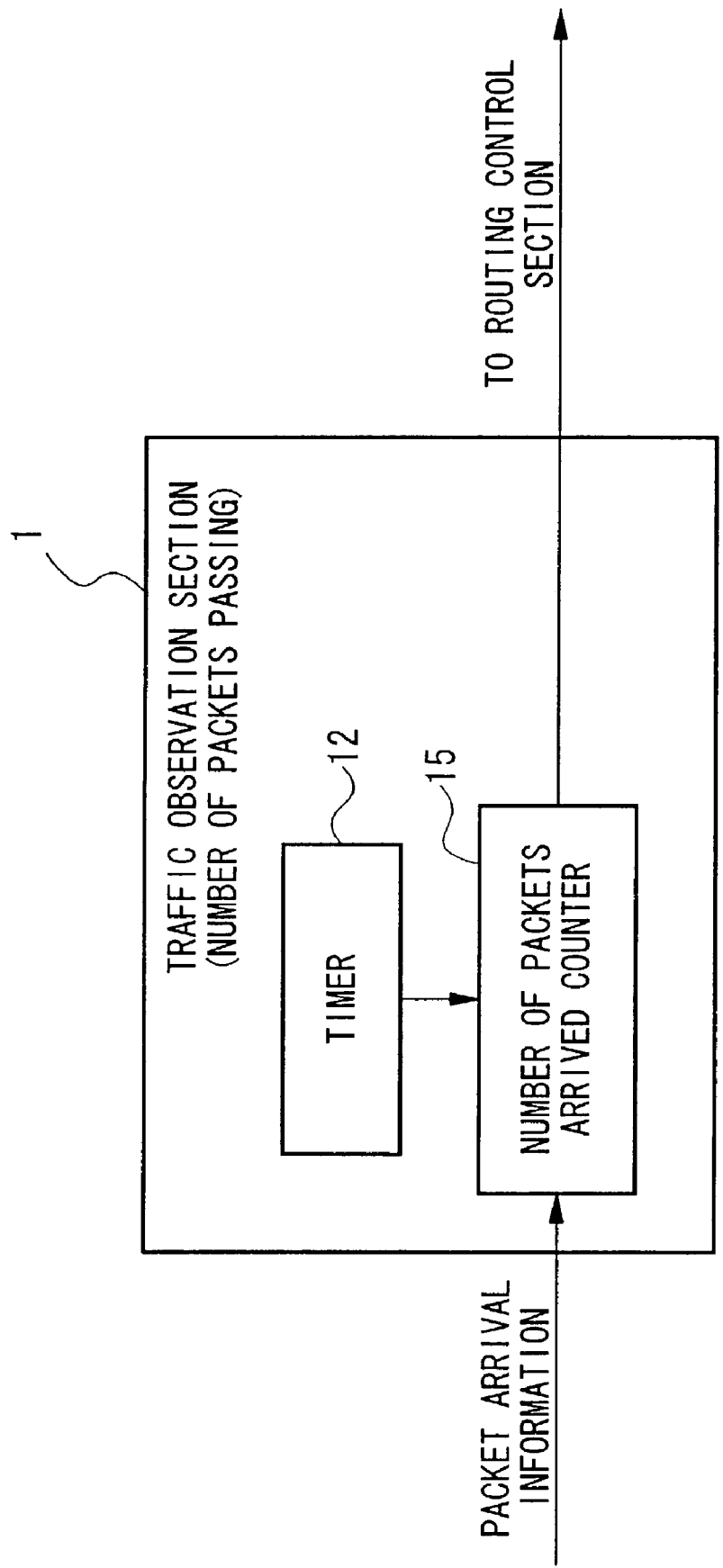
FIG. 5 is another block structure diagram showing a traffic observation section of the third preferred embodiment.
Figure 6:
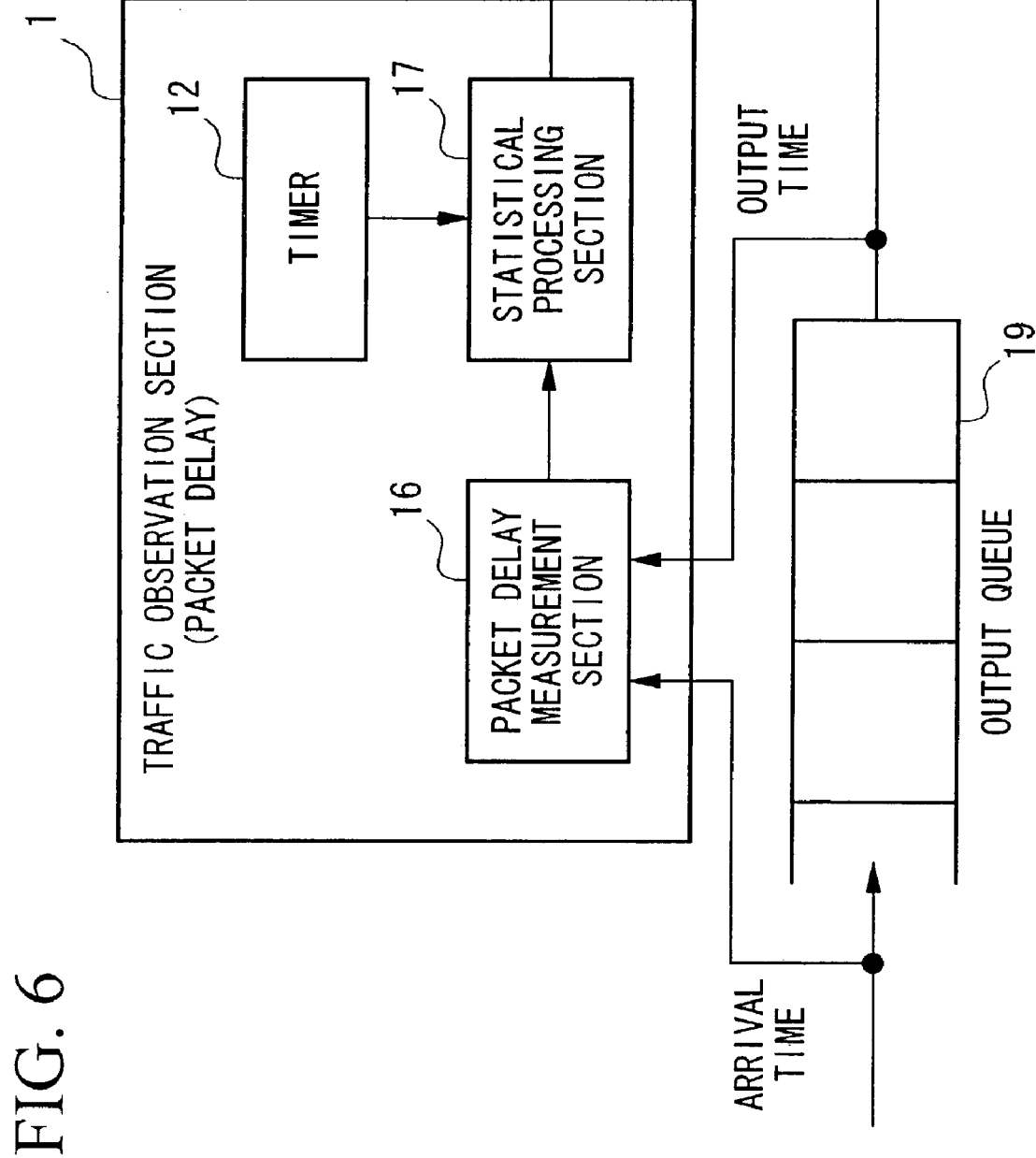
FIG. 6 is yet another block structure diagram showing a traffic observation section of the third preferred embodiment.
Figure 7:
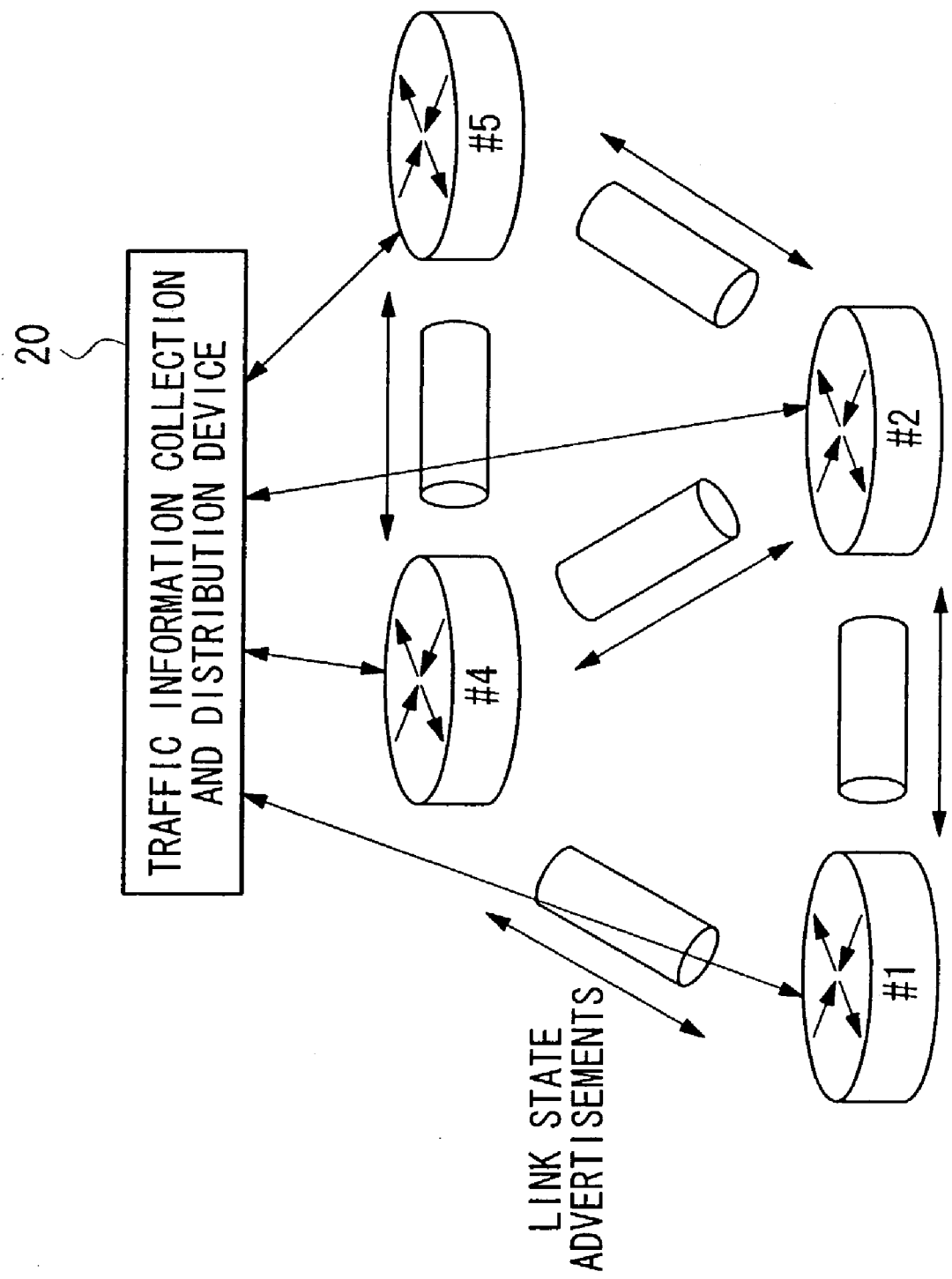
FIG. 7 is a figure showing a packet communication network according to the fourth preferred embodiment.
Figure 8:
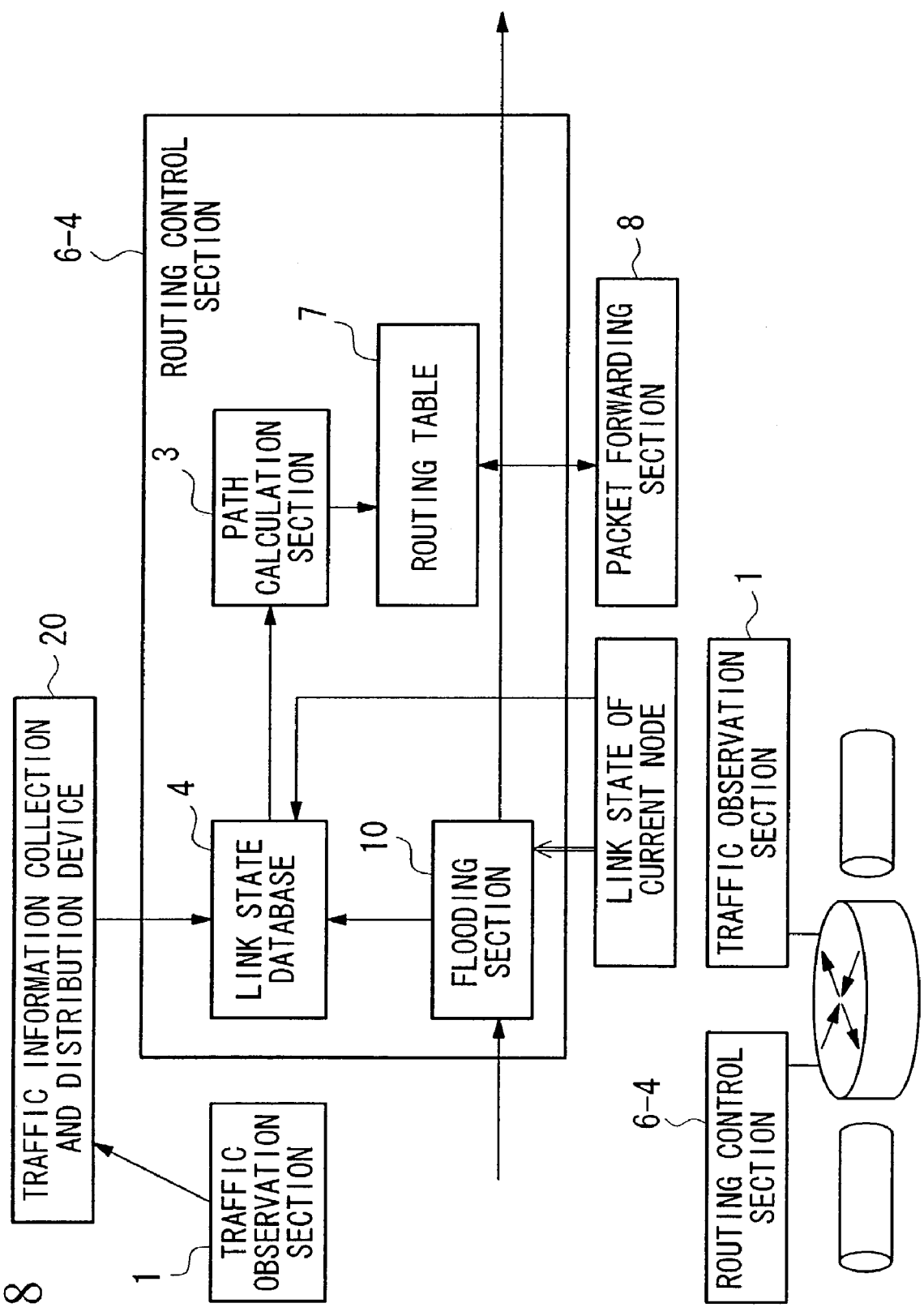
FIG. 8 is a block structure diagram showing the structure of a node of the fourth preferred embodiment.
Figure 9:
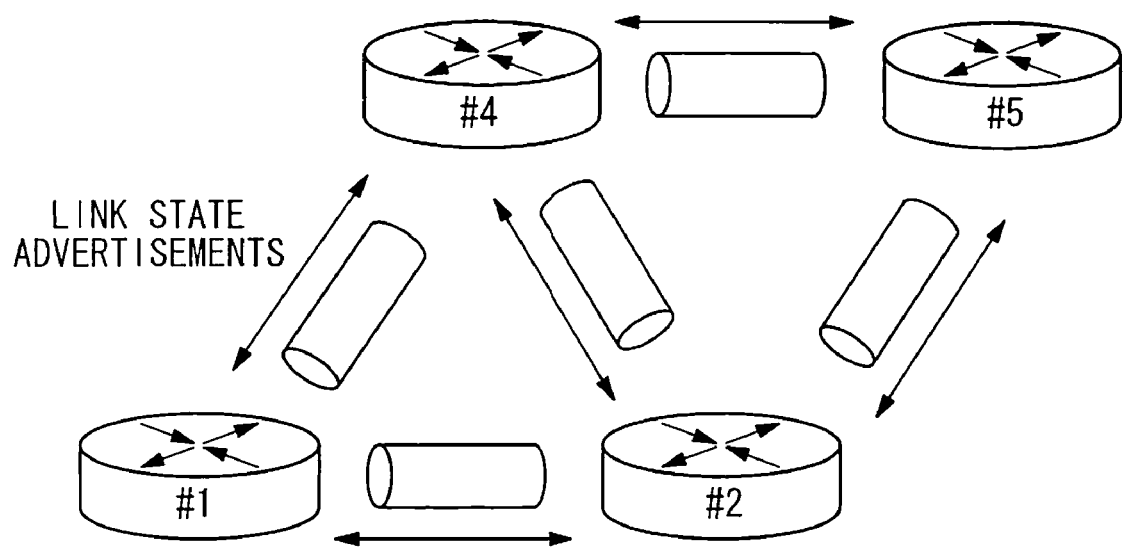
FIG. 9 is a figure showing a packet communication network which includes a link state type routing protocol.
Figure 10:
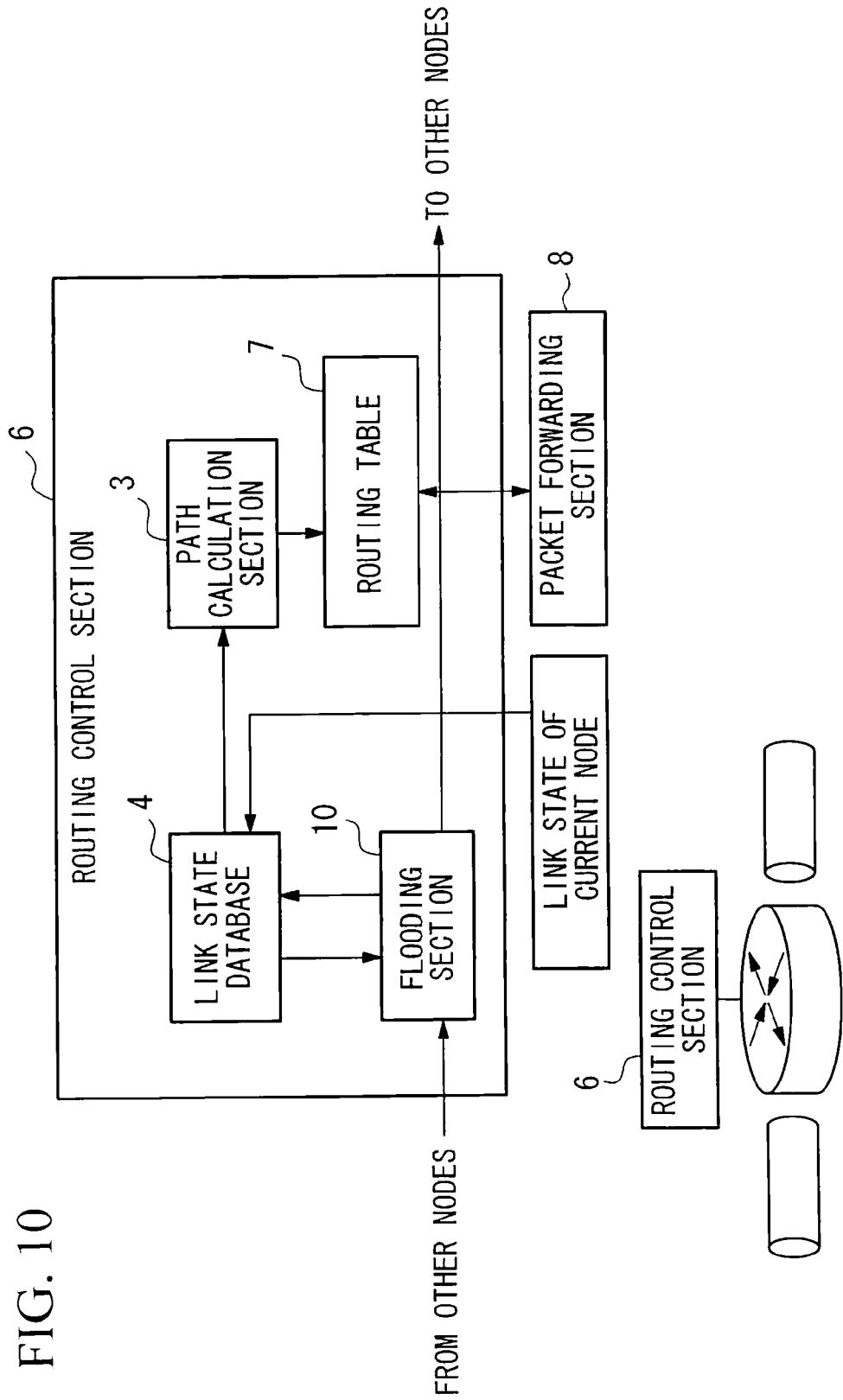
FIG. 10 is a block structure diagram showing the structure of a conventional node.

In the following, preferred embodiments of the present invention will be described with reference to FIGS. 1 through 8. FIG. 1 is a block structure diagram showing the structure of a node according to the first preferred embodiment of the present invention. FIG. 2 is a figure showing a link state database according to this first preferred embodiment. FIG. 3 is a block structure diagram showing the structure of a node according to the second preferred embodiment. FIG. 4 through FIG. 6 are block structure diagrams showing a traffic observation section according to the third preferred embodiment. FIG. 7 is a figure showing a packet communication network according to the fourth preferred embodiment. FIG. 8 is a block structure diagram showing the structure of a node according to the fourth preferred embodiment.

As shown in FIG. 1, this preferred embodiment is a node which comprises a flooding section 10 which advertises link state information which shows the states of the links which are connected to this node, to other nodes, and a path calculation section 3 which calculates a packet forwarding path according to the link state information which is included in the advertisement from this flooding section 10.

Here, the point in which this preferred embodiment is particularly distinguished, is that a traffic observation section 1 is provided, the flooding section 10 appends the traffic observation results which have been observed by the traffic observation section 1 to the link state information, and the path calculation section 3 calculates a dynamic link cost according to the traffic information which is contained in the advertisement from the flooding section 10, and calculates a path according to the dynamic link cost which has thus been calculated.

This link state information includes path capacity, reserved bandwidth, and fixed link cost which is allocated to the path in advance, and the path calculation section 3 calculates a dynamic link cost according to the path capacity, the reserved bandwidth, the fixed link cost which is allocated to the path in advance, and the traffic information which are written into the link state database 4 as shown in FIG. 2.

In the first preferred embodiment of the present invention, as shown in FIG. 1, the routing table 7 is produced according to the path which has been calculated by the path calculation section 3, and, for each packet, the packet forwarding section 8 refers to the IP address of that packet and to this routing table 7, determines the next stage router, and performs packet forwarding to the next stage router.

In the second preferred embodiment of the present invention, a Multi Protocol Label Switch (MPLS) network is assumed, and no routing table such as the one in the first preferred embodiment is referred to for each packet, but instead the path establishment control section 5 shown in FIG. 3 establishes a Label Switch Path (LSP) according to the results of calculation by the path calculation section 3, and a label specified by this LSP is appended to the packets, which are then transmitted.

The third preferred embodiment of the present invention is one which is related to the traffic observation section 1: the traffic observation section 1 shown in FIG. 4 comprises a timer 12, the packet length summation section 13, and the bandwidth used calculation section 14, in order to observe the amount of data which passes per unit time. Or, alternatively, the traffic observation section 1 shown in FIG. 5 comprises a timer 12 and a number of packets arrived counter 15, in order to observe the amount of packets which pass per unit time. Or, alternatively, the traffic observation section 1 shown in FIG. 6 comprises a timer 12, a packet delay measurement section 16, and a statistical processing section 17, in order to observe the packet delay time per unit time.

The fourth preferred embodiment of the present invention, as shown in FIG. 8, is a packet communication network which is provided with a node which includes a flooding section 10 which advertises the link state information which indicates the state of the links connected to this node, to the other nodes, and a path calculation section 3 which calculates a packet forwarding path according to the link state information which is included in these advertisements from the flooding section 10.

Here, the characteristic feature of the fourth preferred embodiment of the present invention is that this traffic observation section 1 of the node is provided with a traffic information collection and distribution device 20 which collects the traffic observation results of each of the nodes and distributes them to predetermined ones of the nodes, and that the traffic observation section 1 transmits the results of traffic observation to the traffic information collection and distribution device 20, while the path calculation section 3 calculates a dynamic link cost from the traffic information which has been distributed by the traffic information collection and distribution device 20, and calculates a path according to the dynamic link cost which has thus been calculated.

It is possible to implement the nodes according to the first and the second preferred embodiment of the present invention by a computer device, which constitutes an information processing device. In other words, by installing the program according to either of these preferred embodiments upon a computer device, it is possible, upon this computer device, as a function which corresponds to a node which is provided within a packet communication network: to implement a function which corresponds to the flooding section 10, of advertising link state information which indicates the state of the links which are connected to the current node, to the other nodes, and a function which corresponds to the path calculation section 3 of calculating a packet forwarding path according to the link state information which is included in the advertisements from this function which corresponds to the flooding section 10; to implement a function which corresponds to the traffic observation section 1; to implement, as a function which corresponds to the flooding section 10, a function of appending the traffic observation results which have been observed by the traffic observation function to the link state information; and to implement, as a function which corresponds to the path calculation section 3, a function of calculating a dynamic link cost according to the traffic information which is included in the advertisements from the flooding section 10, and a function of calculating a path according to the dynamic link cost which has been calculated by this calculation function; and thus to make this computer device constitute a device which corresponds to the node according to the first or the second preferred embodiment of the present invention.

Furthermore, by installing a program according to the preferred embodiment of the present invention upon a computer device, it is possible to implement upon this computer device, as a function which corresponds to the traffic observation section 1 which will be explained with reference to the third preferred embodiment, a function corresponding to the timer 12, the packet length summation section 13, and the bandwidth used calculation section 14, in order to observe the amount of data which passes per unit time, as shown in FIG. 4. Or, alternatively, it is possible to implement a function corresponding to the timer 12 and the number of packets arrived counter 15, in order to observe the number of packets which pass per unit time, as shown in FIG. 5. Or, alternatively, it is possible to implement a function corresponding to the timer 12, the packet delay measurement section 16, and the statistical processing section 17, in order to observe the packet delay time per unit time, as shown in FIG. 6.

Furthermore, it is possible to implement the node according to the fourth preferred embodiment of the present invention by a computer device. In other words, by installing the program according to this preferred embodiment upon a computer device, it is possible, upon this computer device: to implement a function which corresponds to a node which includes a function which corresponds to the flooding section 10 of advertising link state information which indicates the state of the links which are connected to the current node, to the other nodes, and a function which corresponds to the path calculation section 3 of calculating a packet forwarding path according to the link state information which is included in the advertisements from flooding section 10; to implement a function which corresponds to the traffic observation section 1; to implement, as this traffic observation function, a function of collecting together the traffic observation results for each of the nodes and of transmitting these traffic observation results to a traffic information collection and distribution devices 20 which distributes them to predetermined nodes; and to implement, as a function which corresponds to the path calculation section 3, a function of calculating a dynamic link cost according to the traffic information which is distributed by the traffic information collection and distribution device 20, and a function of calculating a path according to the dynamic link cost which has been calculated by this calculation function; and thus to make this computer device constitute a device which corresponds to the node according to the fourth preferred embodiment of the present invention.

This link state information may include path capacity, reserved bandwidth, and fixed link cost which is allocated to the path in advance, and it is possible to implement, as a function which corresponds to the path calculation section 3, a function of calculating a dynamic link cost according to the path capacity, reserved bandwidth, fixed link cost which is allocated to the path in advance, and the traffic information which are included in the link state information.

By recording a program according to a preferred embodiment of the present invention upon a recording medium of a preferred embodiment of the present invention, it is possible to install this program according to the preferred embodiment upon a computer device by using this recording medium. Or, alternatively, it is possible to install this program according to the preferred embodiment directly upon a computer device via a network from a server upon which this program according to the preferred embodiment is kept.

By doing this, the current traffic information for the links is applied to the link state type routing protocol, and, by making it possible to select a path that reflects the state of the links which are used by means of a computer device, it is possible to implement a node and a packet communication network which can efficiently take advantage of network resources by being able to select a path according to a desired purpose.

In the following, these preferred embodiments will be further explained in detail.

Embodiment 1

In the first preferred embodiment of the present invention, as shown in FIG. 1, a node (hereinafter termed the "current node") comprises a routing control section 6-1 and a traffic observation section 1. The routing control section 6-1 comprises a link state database 4, a flooding section 10, a path calculation section 3, and a routing table 7. The traffic observation section 1 collects traffic information for each link. The types of traffic information which may be observed are: amount of data per unit time (bandwidth used), number of packets passing per unit time, in-node packet delay time, and the like.

Since with this first preferred embodiment the traffic information is reflected in the link state information, the link state database 4 is updated by using a method of advertising the link state information by flooding. If a packet which has arrived after having been transmitted by flooding by the flooding section 10 is one which is now received for the first time, then it is also transmitted to the other nodes which are connected to the current node, at the same time as it is taken in by the current node; while on the other hand, if it is a packet which has already been received at the current node after having been transmitted by the flooding section 10, then it is discarded, since such a packet is one which has arrived at the current node after having returned around a loop.

The traffic information which is observed is transmitted to the link state database 4 and to the flooding section 10 in the routing control section 6-1. As shown in FIG. 2, the traffic information is appended to the link state information for each link. The link state database 4 is updated by notifying the link state for the current node to the link state database 4.

The updated link state is advertised as link state information via the flooding section 10 to the other nodes which are connected to the current node. Furthermore, link state information which is advertised from the other nodes is used to update the link state database of the current node, and also is further advertised to the other nodes.

By thus advertising this link state information, the link state information is propagated to all of the nodes within the communication network, and accordingly it is possible to maintain the same link state database 4 in all of the nodes. The path calculation section 3 performs path calculation based upon the information in the link state database 4, and updates the routing table 7.

Next, an example will be shown of a method of path calculation based upon information in a link state database 4 to which traffic information has been appended. Here, best effort class traffic will be considered. If the band is reserved for high priority class, and, if high priority class is not currently used, traffic of best effort class may as well use this band; but, if high priority class traffic is using this band, best effort class traffic can no longer use this band.

The case in which the bandwidth used is employed as the traffic information will now be discussed. It is possible to calculate the bandwidth not used by calculating the difference between the capacity of the link and the bandwidth actually used. The shortest path from the current node to each arrival node is selected by taking the reciprocal of the bandwidth not used as the distance of the link. Based upon this result, the destination of the current hop is determined, and is reflected in the routing table 7. This method is one which aims at a result of minimizing the end-to-end packet forwarding delay time.

The case in which the number of packets passing per unit time is employed as the traffic information will now be discussed. The above described method can be followed by roughly calculating the bandwidth used by dividing the number of packets by the average packet length, since it is possible to predict the average packet length from the network activity situation.

The case in which the in-node delay time is employed as the traffic information will now be discussed. The packet delay between nodes is fixed since there is no queuing between the nodes. Accordingly, the shortest path from the current node to each arrival node is selected by taking the sum of the in-node delay time and the delay times between the nodes as the distance of the link. Based upon this result, the destination of the current hop is determined, and is reflected in the routing table 7. This method is, again, one which attempts to attain the result of minimizing the end-to-end delay time for packet forwarding.

The above described method for path calculation using traffic information is given as an example; it is possible to employ various different methods. Since in this manner the path is calculated using the traffic information which has been obtained by observing the actual traffic, it is possible to select a path according to the desired purpose.

Embodiment 2

In the first preferred embodiment described above, the routing table 7 was referred to for each packet; but, in the second preferred embodiment of the present invention, a Multi-Protocol Label Switch (MPLS) network is assumed, and calculations are performed for establishing a Label Switch Path (LSP). FIG. 3 shows the structure of a node according to this second preferred embodiment.

When establishing an LSP, the dispatch side node refers to the link state database 4 and perform path calculation. According to these results which have been obtained by path calculation, the LSP is established by a path establishment control section 5 as the desired path, for example by signaling.

Embodiment 3

The third preferred embodiment of the present invention will be disclosed in which the amount of data (the bandwidth used) per unit time, the number of packets passing per unit time, and the in-node packet delay time, which are the three types of traffic information described in the first preferred embodiment, are measured in the node.

FIG. 4 shows the traffic observation section 1 (for the 'bandwidth used' case) of this third preferred embodiment. Using a timer 12 and a packet length summation section 13, a bandwidth used calculation section 14 adds up the packet length for the packets which have passed in a unit time interval, and calculates the bandwidth used from the result. The bandwidth used is expressed in, for example, Mbits/sec.

FIG. 5 shows the traffic observation section 1 (for the 'number of packets passing' case) of this third preferred embodiment. The number of packets passing per unit time is measured using a timer 12 and a number of packets arrived counter 15. The number of packets passing is expressed in, for example, packets/sec.

FIG. 6 shows the traffic observation section 1 (for the 'in-node delay' case) of this third preferred embodiment. Here, it is assumed that an output queue 19 generates the in-node delay. A packet delay measurement section 16 records the time instant of the arrival of a packet and the time instant of the output of a packet, and takes the difference between these as the in-node delay time for that packet. A time period is set by a timer 12, over which a statistical processing section 17 should perform statistical processing, for example, by calculating the average of the in-node delay times for each packet in the time period, and taking the average as the in-node delay time.

Embodiment 4

In the first and the second preferred embodiments, in order to reflect the traffic information to the conventionally used link state information, a method of updating the link state database 4 was employed which used a method of advertising the link state information by flooding by the flooding section 10. In the fourth preferred embodiment of the present invention, however, as shown in FIG. 7, traffic information for each node is managed collectively by being sent to a traffic information collection and distribution device 20, and this traffic information collection and distribution device 20 collects the traffic information from each node, and distributes the traffic information to each node. As shown in FIG. 8, each of the nodes employs a method of updating the link state database 4 from the traffic information which has thus been distributed. In this manner, it is possible to select the path according to the desired purpose, since the path is calculated using the traffic information which is obtained by observing the actual traffic, in the same manner as with the first preferred embodiment.

Figure 12:
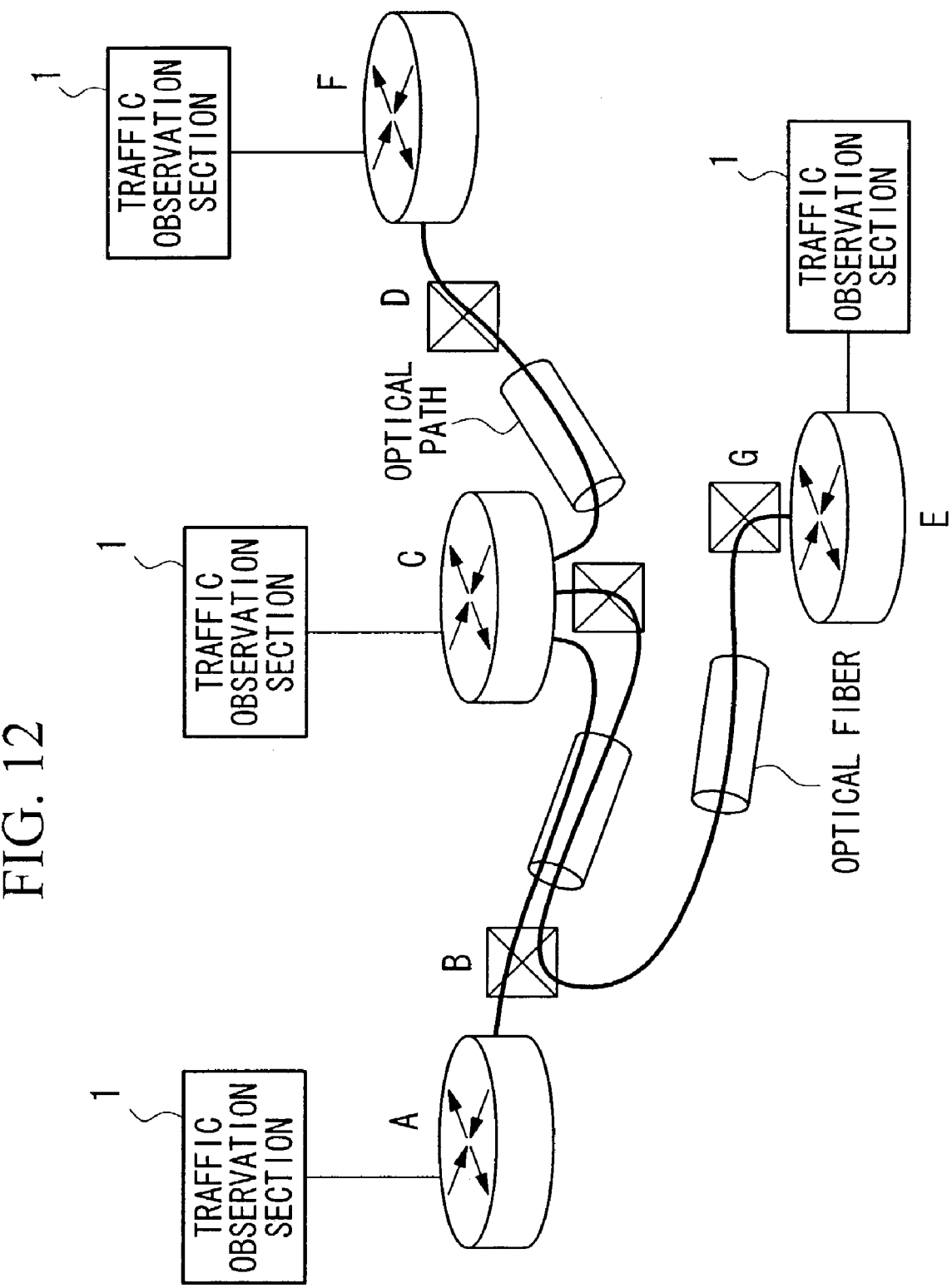
FIG. 12 is a figure showing a packet communication network according to the fifth preferred embodiment.
Figure 13A:
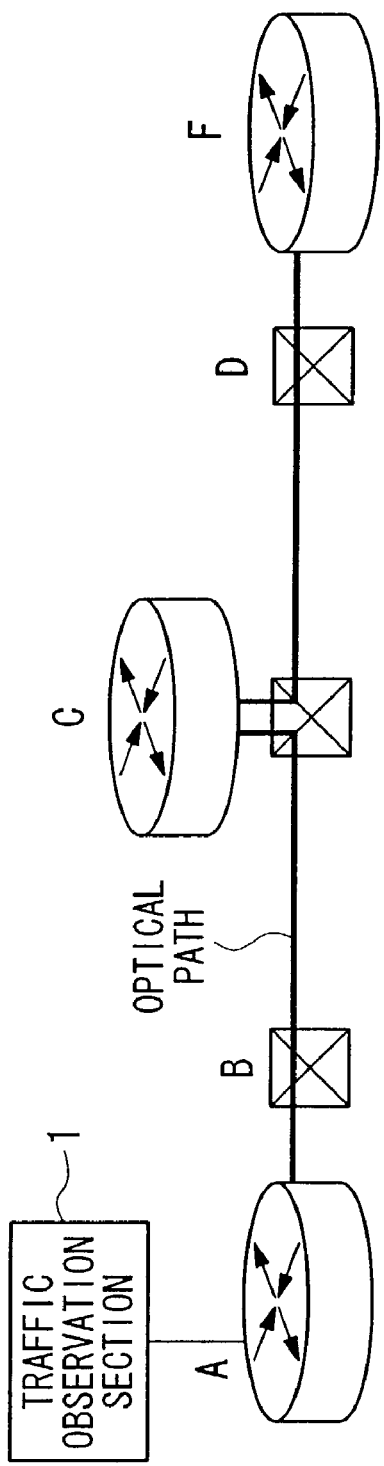
FIGS. 13A and 13B are figures showing a cut through example (the first portion thereof) in the fifth preferred embodiment.
Figure 13B:
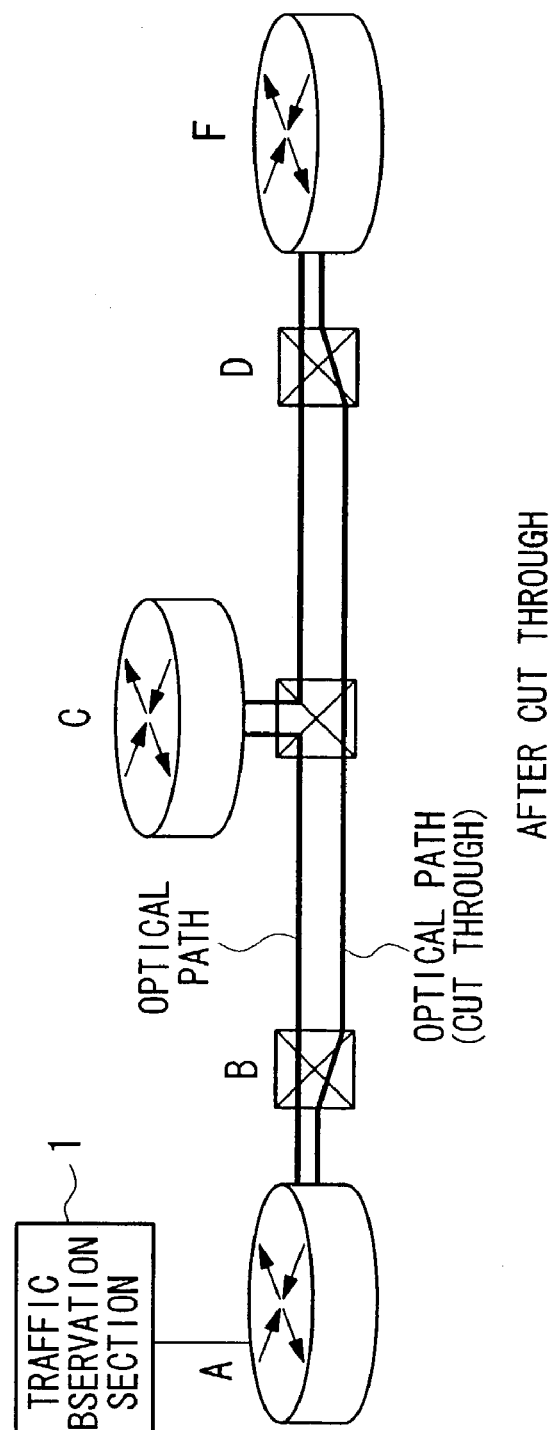
Figure 15:
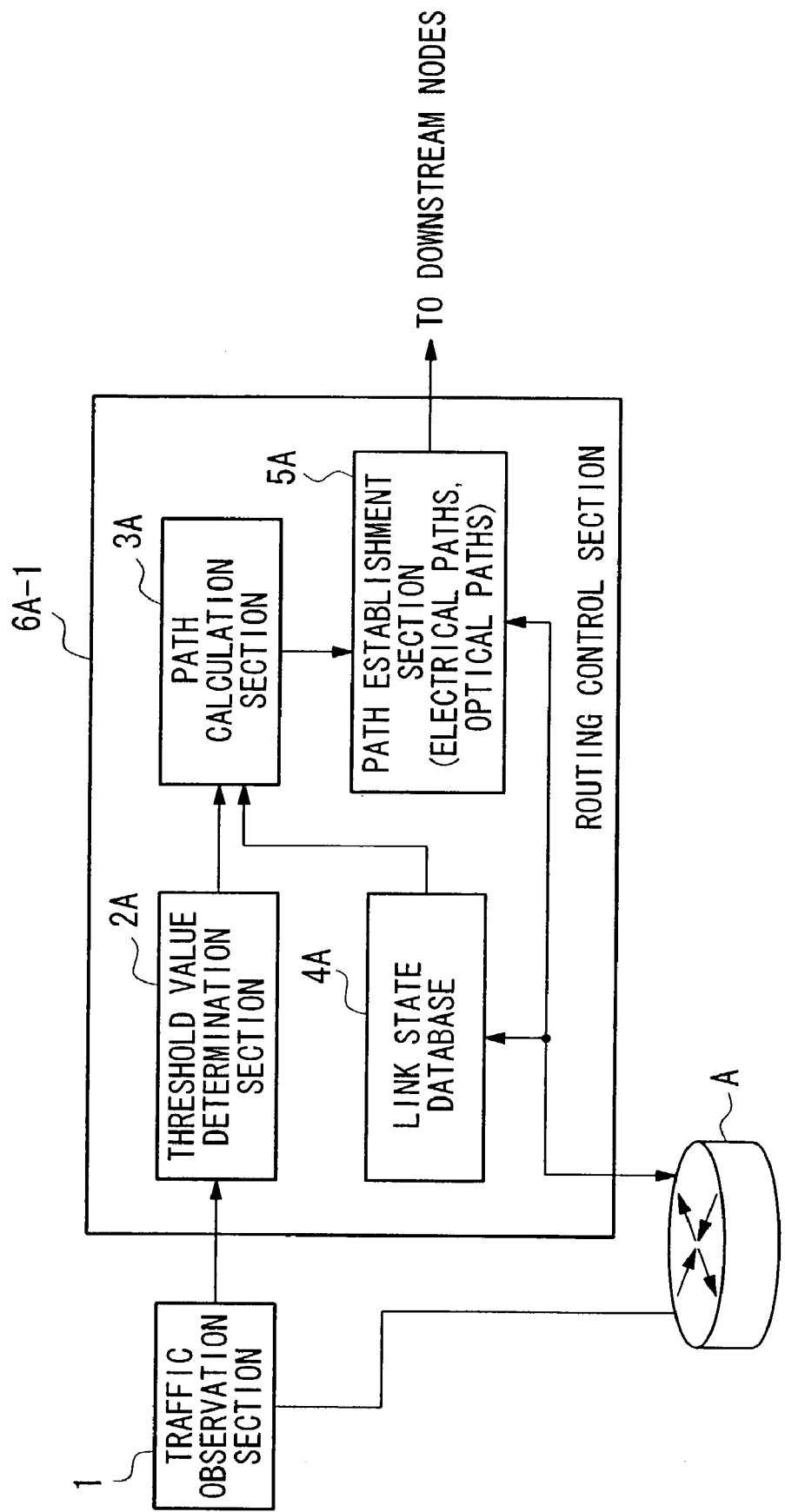
FIG. 15 is a block structure diagram showing a router according to the fifth preferred embodiment.
Figure 16:
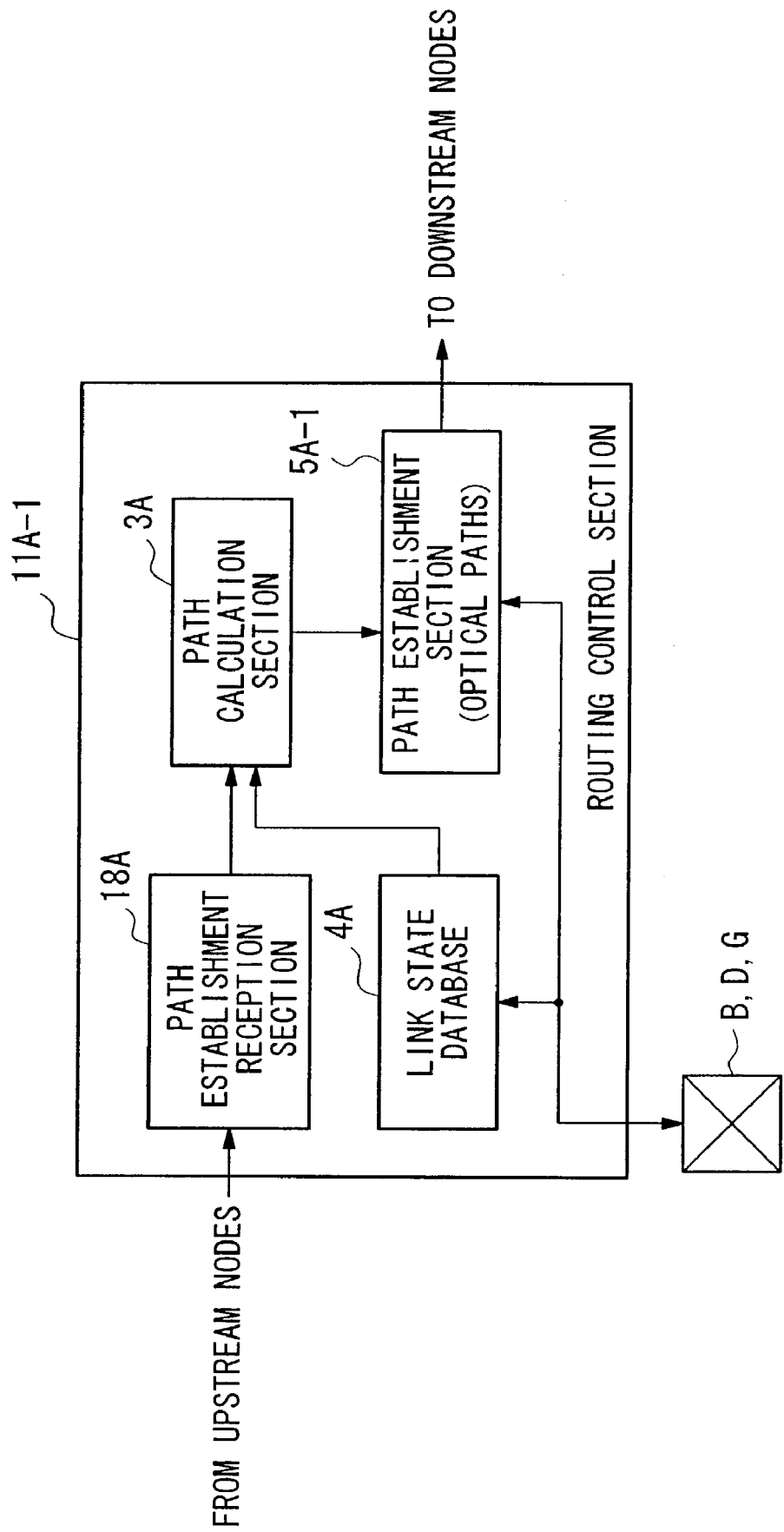
FIG. 16 is a block structure diagram of an optical cross-connect according to the fifth preferred embodiment.
Figure 17:
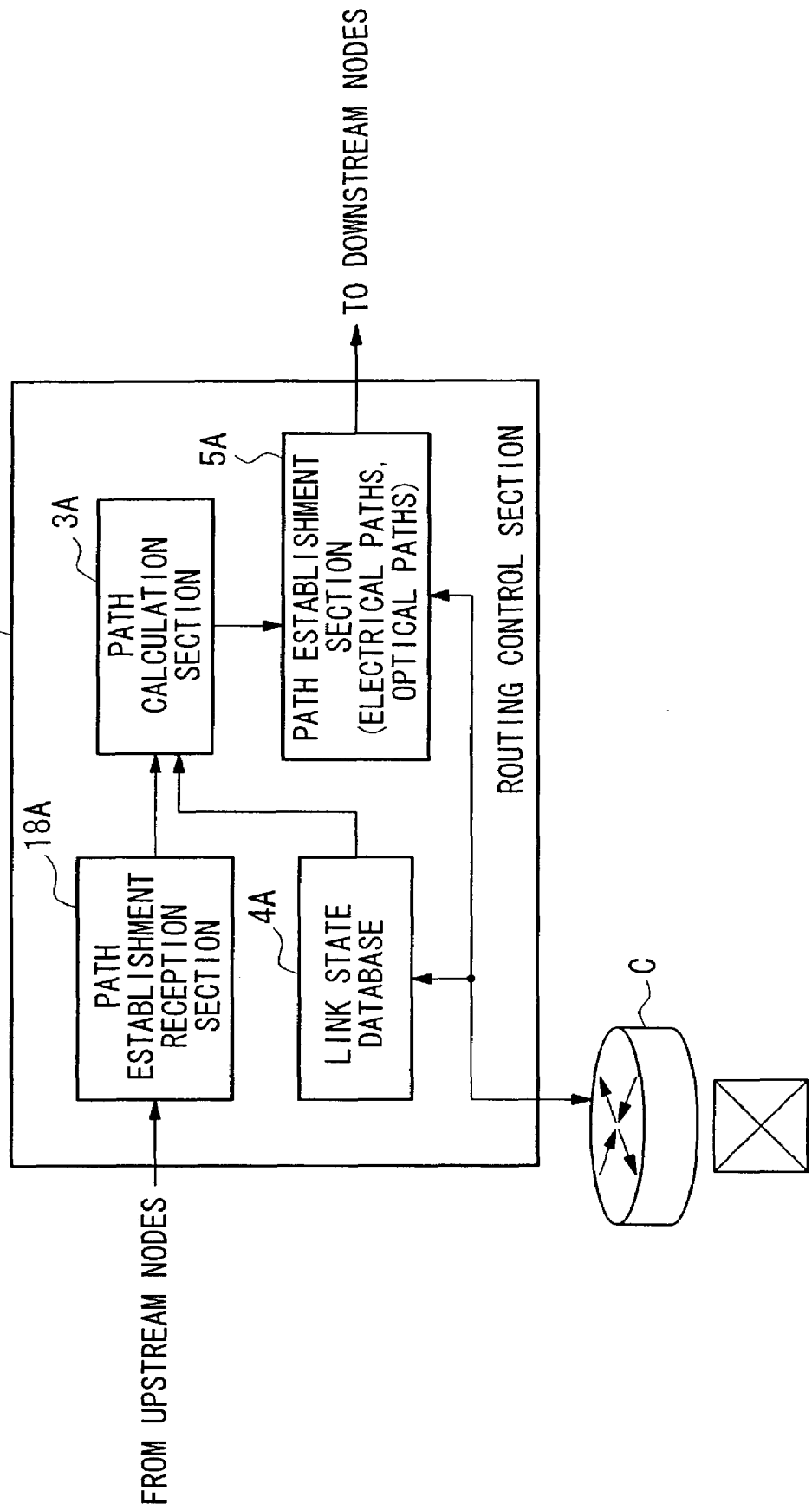
FIG. 17 is a block structure diagram of an optical router according to the fifth preferred embodiment.
Figure 18A:
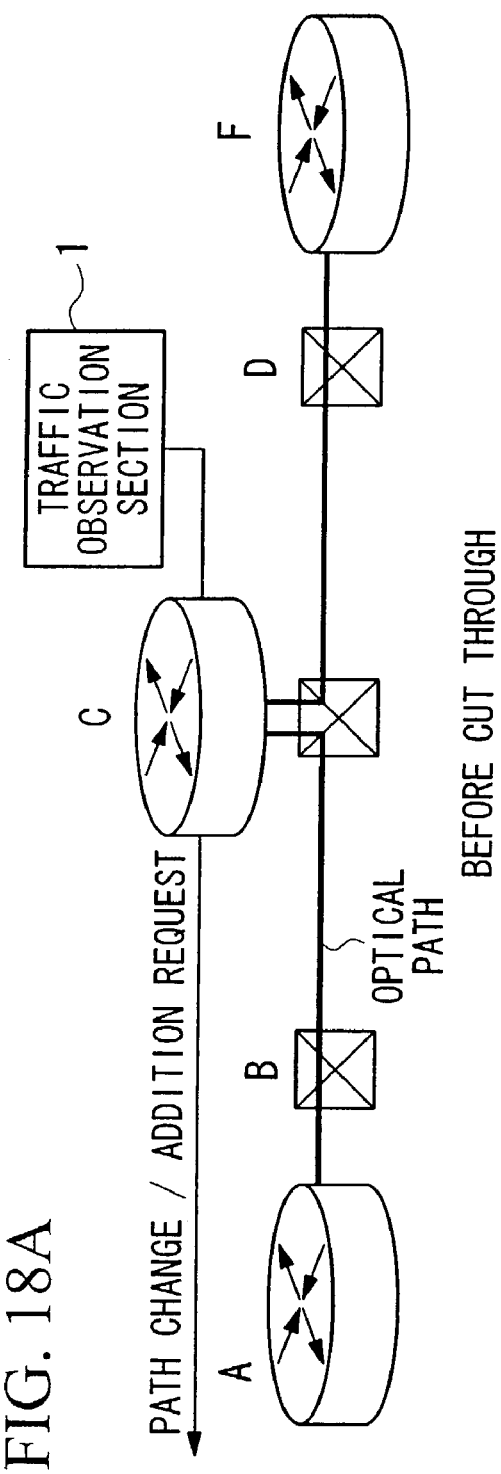
FIGS. 18A and 18B are figures showing a cut through example in the sixth preferred embodiment.
Figure 18B:
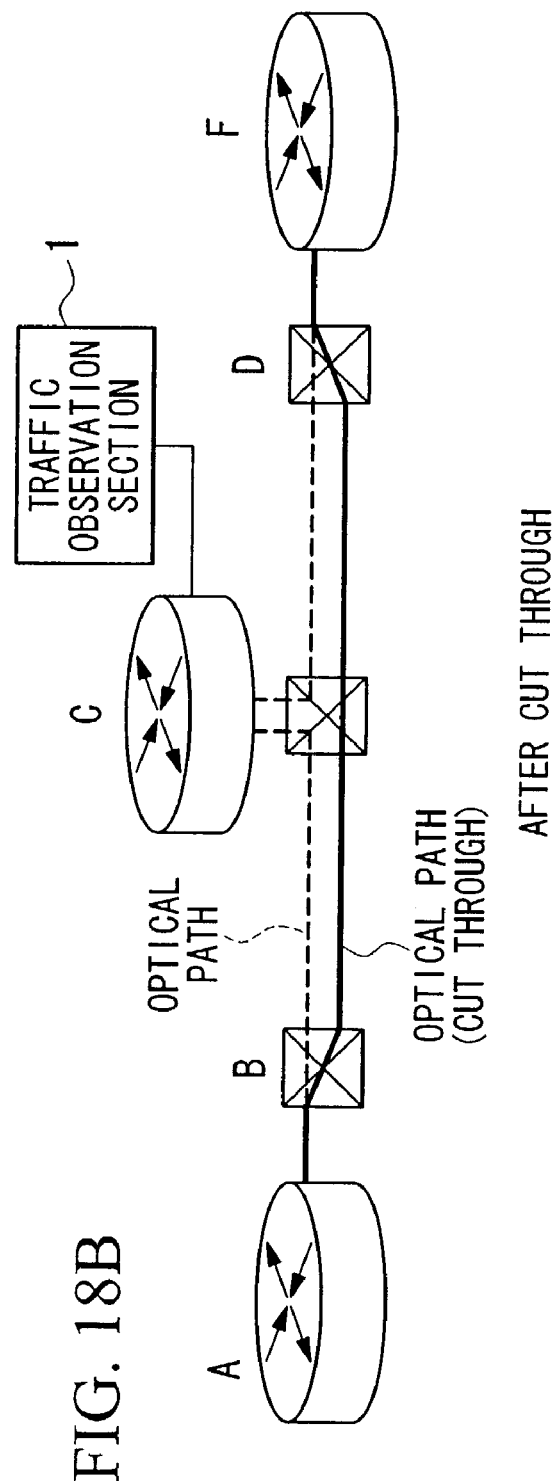
Figure 19:
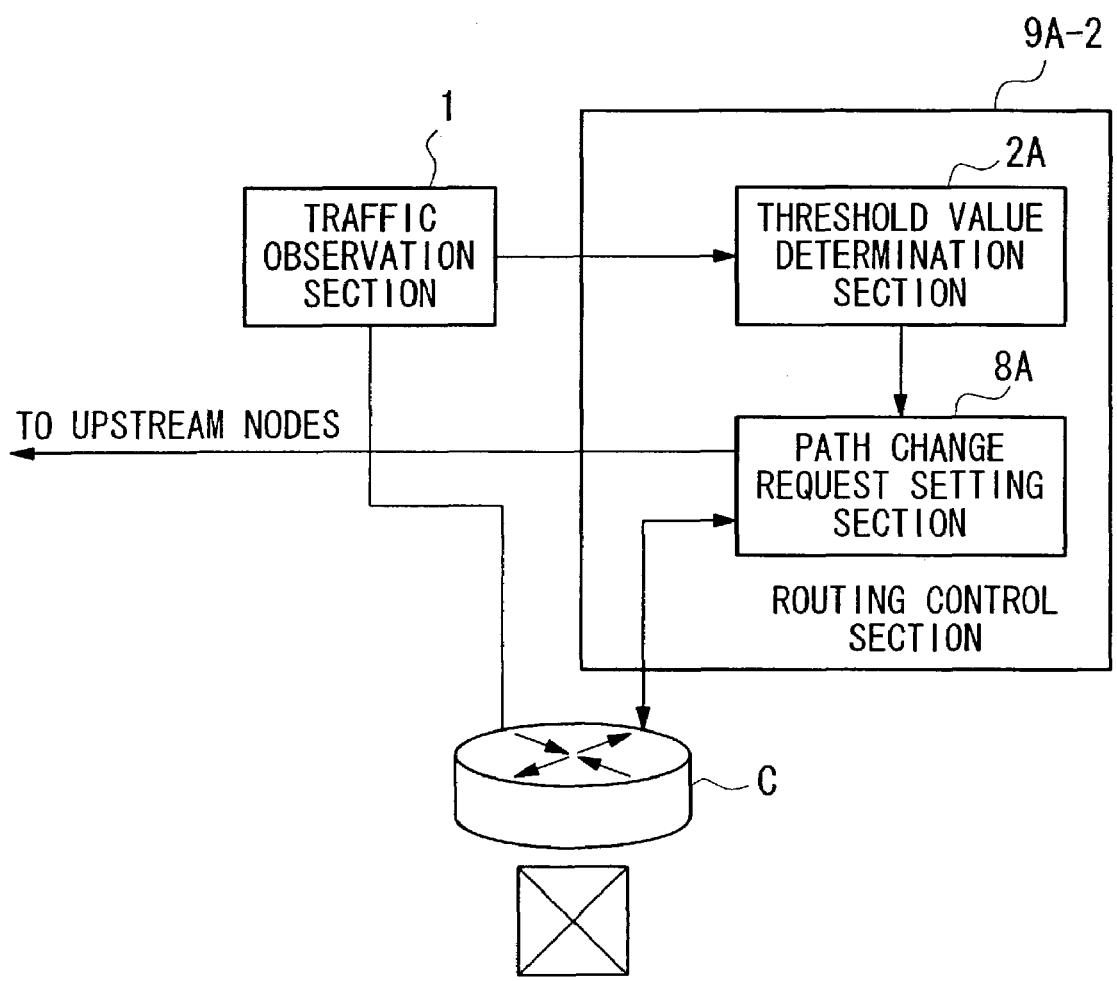
FIG. 19 is a block structure diagram of an optical router according to the sixth preferred embodiment.
Figure 20:
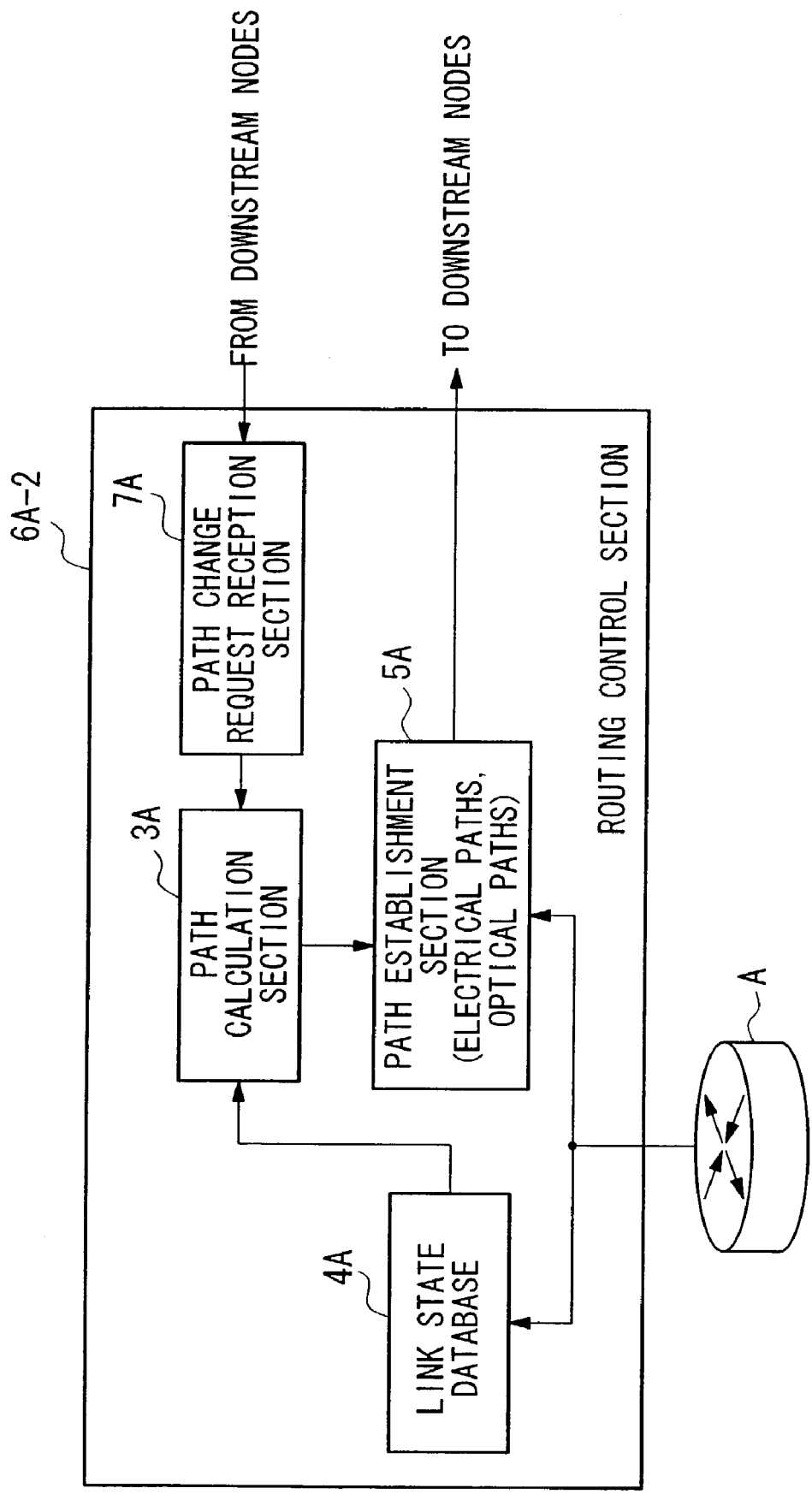
FIG. 20 is a block structure diagram of a router according to the sixth preferred embodiment.
Figure 21:
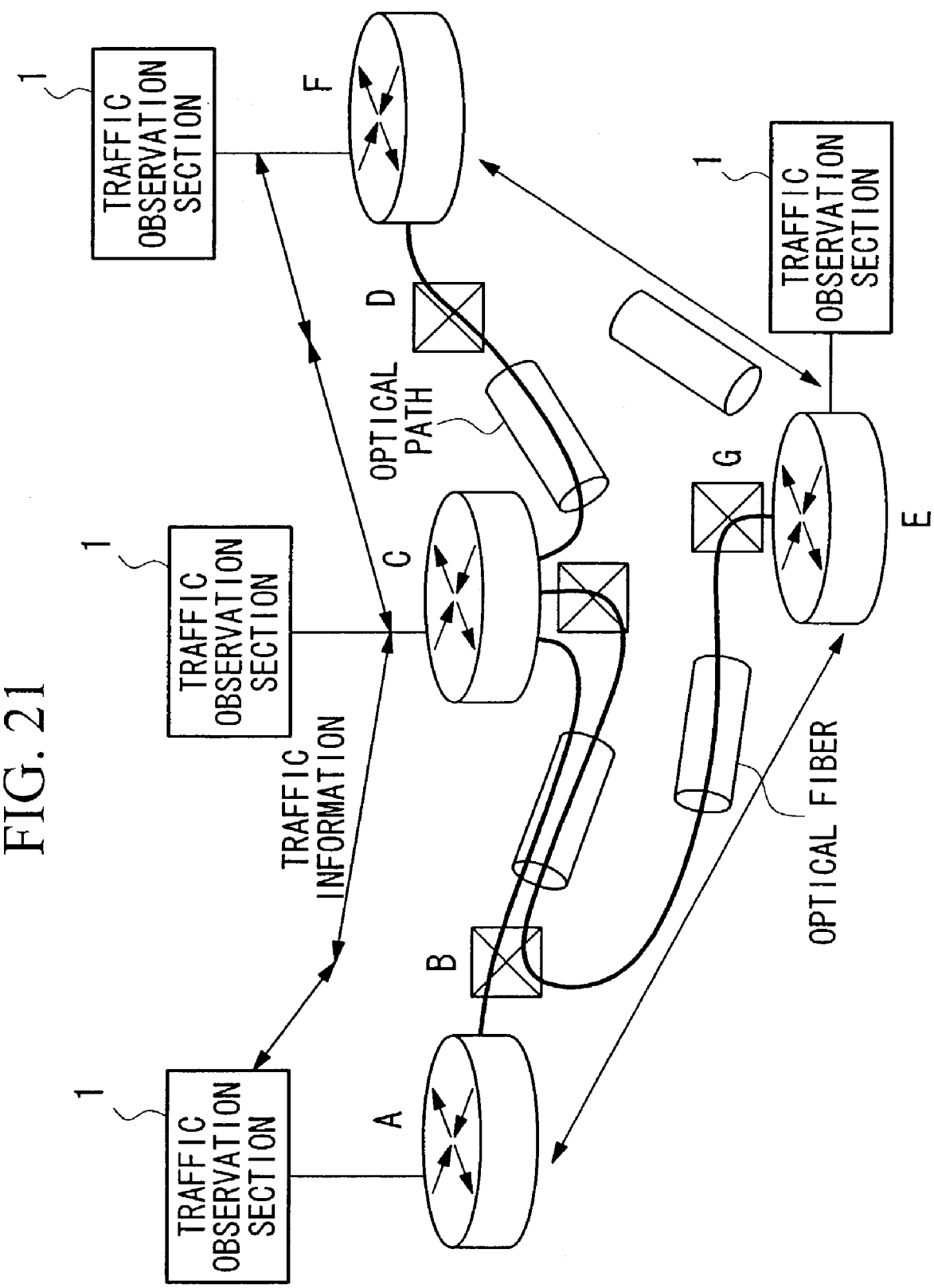
FIG. 21 is a figure showing a packet communication network according to the eighth preferred embodiment.
Figure 22:
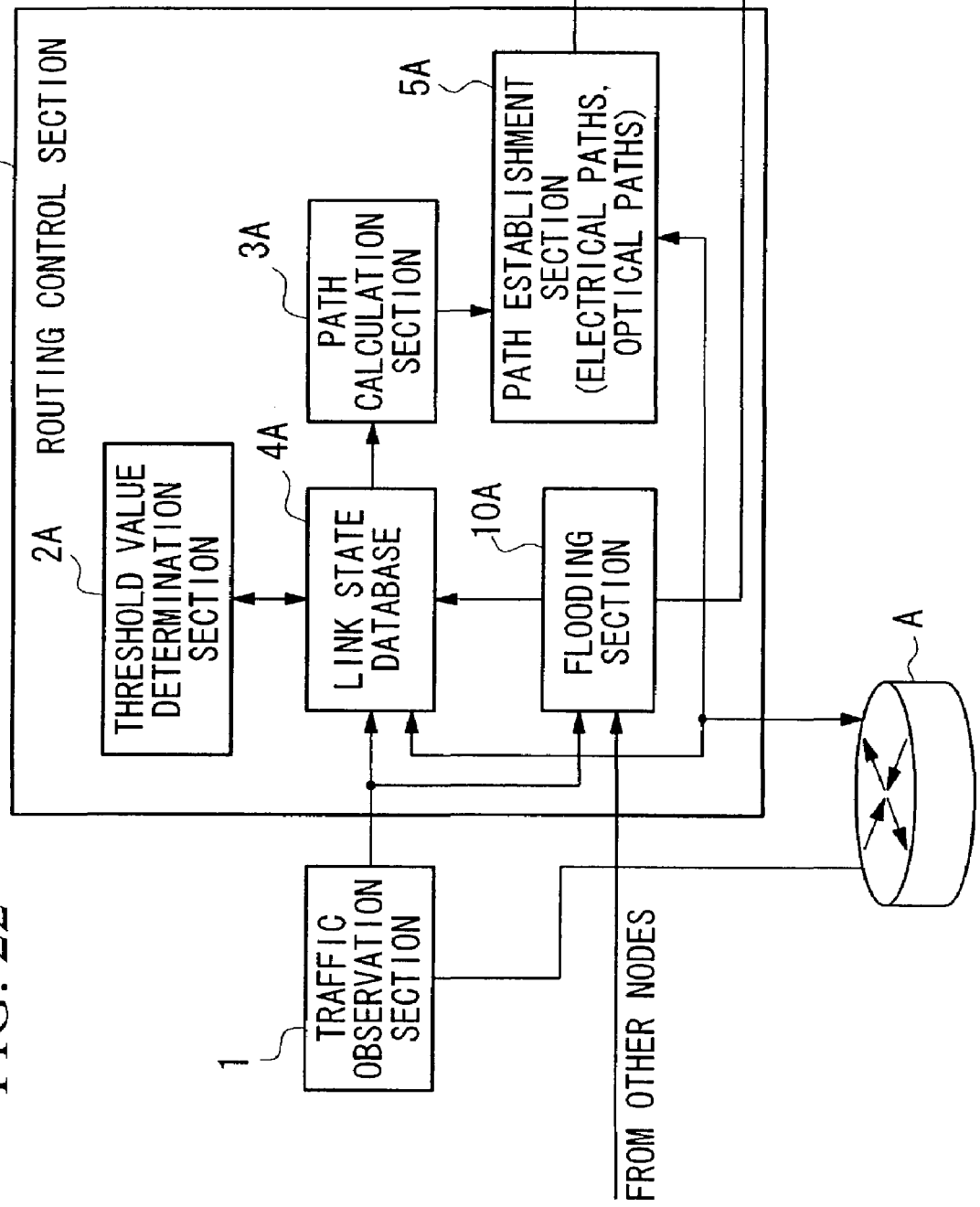
FIG. 22 is a block structure diagram of a router according to the eighth preferred embodiment.
Figure 23:
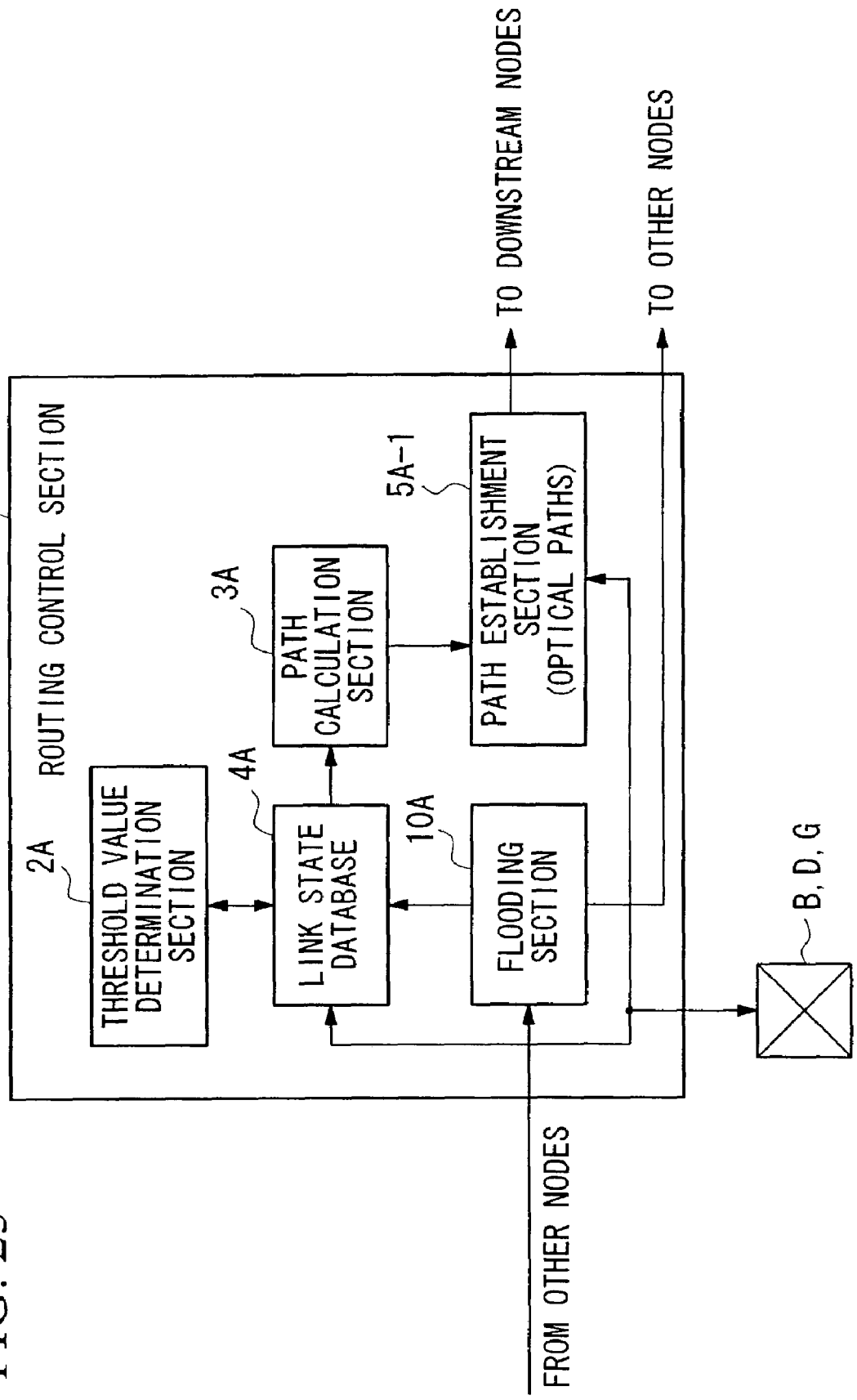
FIG. 23 is a block structure diagram of an optical cross-connect according to the eighth preferred embodiment.
Figure 24:
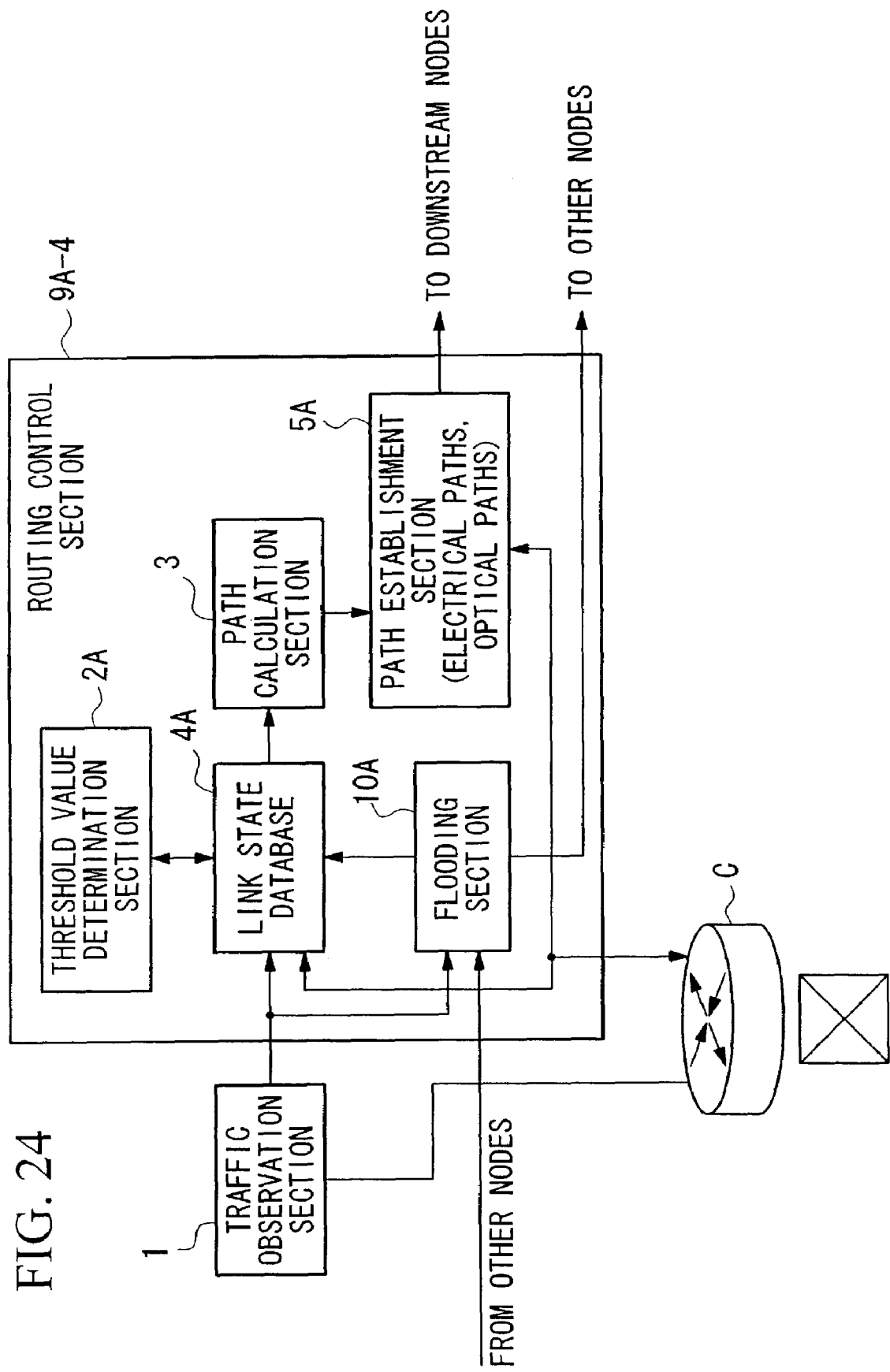
FIG. 24 is a block structure diagram of an optical router according to the eighth preferred embodiment.
Figure 25:
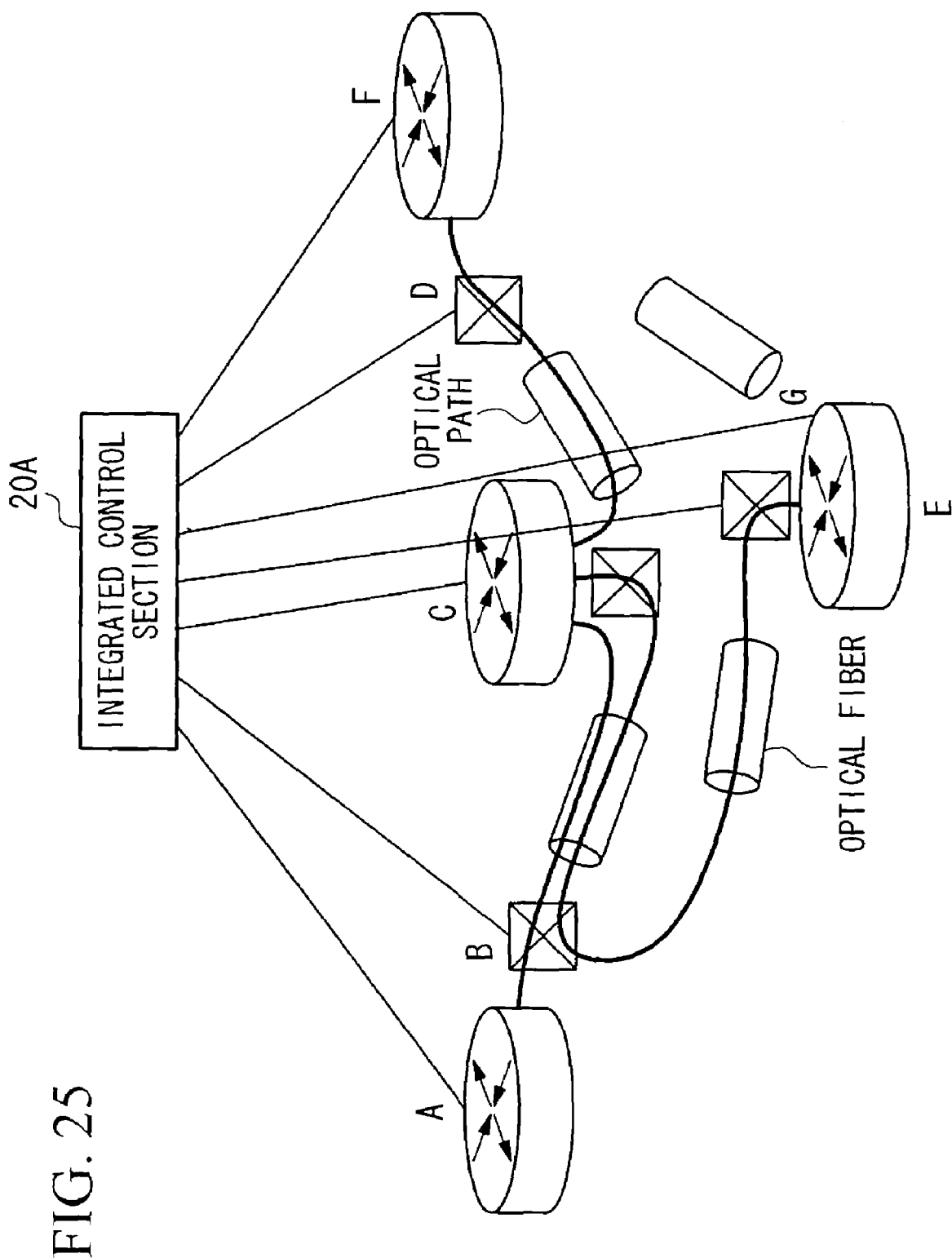
FIG. 25 is a figure showing a conventional packet communication network.
Figure 26A:
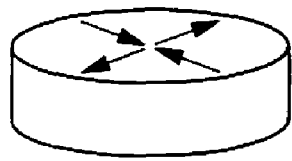
FIGS. 26A through 26C are figures showing a classification of switching functions.
Figure 26B:
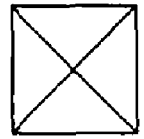
Figure 26C:
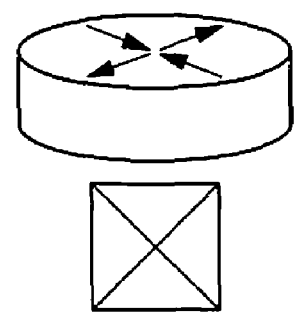
Figure 27:
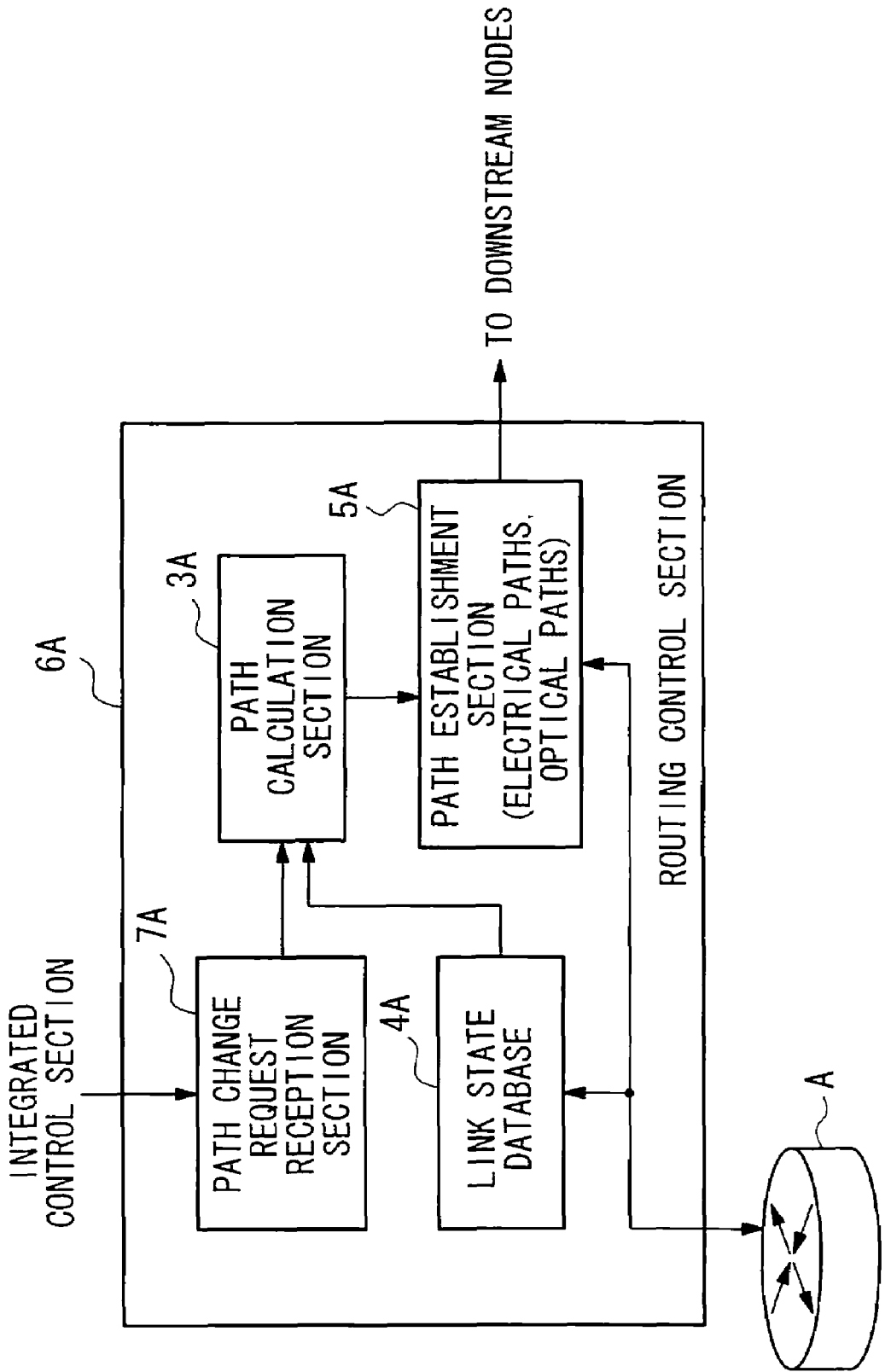
FIG. 27 is a block structure diagram of a conventional router.

Next, the fifth through the eighth preferred embodiments of the present invention will be described with reference to FIGS. 4, 5, 6, and 12 through 24. FIG. 12 is a figure showing a packet communication network according to the fifth preferred embodiment. FIGS. 13A and 13B are figures showing a cut through example (the first portion thereof) according to the fifth preferred embodiment. FIGS. 14A and 14B are figures showing a cut through example (the second portion thereof) according to the fifth preferred embodiment. FIG. 15 is a block structure diagram showing a router according to the fifth preferred embodiment. FIG. 16 is a block structure diagram, of an optical cross-connect according to the fifth preferred embodiment. FIG. 17 is a block structure diagram of an optical router according to the fifth preferred embodiment. FIGS. 18A and 18B are figures showing a cut through example in the sixth preferred embodiment. FIG. 19 is a block structure diagram of an optical router according to the sixth preferred embodiment. FIG. 20 is a block structure diagram of a router according to the sixth preferred embodiment. FIG. 4 is a block structure diagram showing a traffic observation section according to the seventh preferred embodiment. FIG. 5 is another block structure diagram showing a traffic observation section according to the seventh preferred embodiment. FIG. 6 is yet another block structure diagram showing a traffic observation section according to the seventh preferred embodiment. FIG. 21 is a figure showing a packet communication network according to the eighth preferred embodiment. FIG. 22 is a block structure diagram of a router according to the eighth preferred embodiment. FIG. 23 is a block structure diagram of an optical cross-connect of the eighth preferred embodiment. FIG. 24 is a block structure diagram of an optical router according to the eighth preferred embodiment.

The fifth preferred embodiment of the present invention, as shown in FIG. 12, is a packet communication network which comprises routers A, E, and F which perform by IP address-based packet switching, optical cross-connects B, D, and G which perform wavelength-based path switching, and an optical router C which performs both IP address-based packet switching and wavelength-based path switching, and the optical cross-connects B, D, and G and the optical router C which is a relay node are provided between the router A which is the dispatch side node and the routers E and F which are the arrival side nodes; and switch processing either of the wavelength-based path switching or of the IP address-based packet switching is applied to a single path between the router A and the routers E and F, while the router A, as shown in FIG. 15, comprises a path establishment section 5A which sets the switch processing.

Here, the characteristic feature of the fifth preferred embodiment of the present invention is that the router A comprises a traffic observation section 1, and the path establishment section 5A selects one or the other of the types of switch processing according to the results of observation by the traffic observation section 1.

The sixth preferred embodiment of the present invention, as shown in FIGS. 18A and 18B, is a packet communication network which comprises routers A, and F which perform IP address-based packet switching, optical cross-connects B and D which perform wavelength-based path switching, and an optical router C which performs both IP address-based packet switching and wavelength-based path switching, and the optical cross-connects B and D and the optical router C which are relay nodes are provided between the router A which is the dispatch side node and the router F which is the arrival side node; and switch processing either of the wavelength-based path switching or of the IP address-based packet switching is applied to a single path between the router A and the router F, while the router A, as shown in FIG. 20, comprises a path establishment section 5A which sets the switch processing.

Here, the characteristic feature of the sixth preferred embodiment of the present invention, as shown in FIG. 19, is that the optical router C is provided with a traffic observation section 1 and with a path change request setting section 8A which notifies the results of observation by the traffic observation section 1 to the router A, and the path establishment section 5A of the router A shown in FIG. 20 selects one or the other of the types of switch processing according to the results of observation which are included in the notifications of the path change request setting section 8A.

The eighth preferred embodiment of the present invention, as shown in FIG. 21, is a packet communication network which comprises routers A, E, and F which perform IP address-based packet switching, optical cross-connects B, D, and G which perform wavelength-based path switching, and an optical router C which performs both IP address-based packet switching and wavelength-based path switching, and the optical cross-connects B, D, and G and the optical router C which are relay nodes are provided between the routers A, E and F which are the dispatch side and the arrival side nodes; and switch processing either of the wavelength-based path switching or of the IP address-based packet switching is applied to a single path between the router A and the routers E and F, while the router A, as shown in FIG. 22, comprises a path establishment section 5A which sets the switch processing.

Here, the characteristic feature of this eighth preferred embodiment of the present invention, as shown in FIGS. 22 and 24, is that the routers A, E, and F and the optical router C each comprises a traffic observation section 1 and a flooding section 10A which advertises the results of observation by the traffic observation section 1 to other nodes, and the path establishment section 5A of the router A shown in FIG. 22 selects one or the other of the types of switch processing according to the results of observation which are included in the advertisements from the flooding sections 10A. The flooding section 10A writes the observation results into a portion of the link information for OSPF.

When the switch processing is IP address-based packet switching, and when the decision results by a threshold value determination section 2A indicates that the results of observation exceed a certain threshold value, then the path establishment section 5A switches the switch processing to wavelength-based path switching.

In order to observe the number of packets passing per unit time, the traffic observation section 1 in the seventh preferred embodiment which will be explained, as shown in FIG. 4, comprises a timer 12, a packet length summation section 13, and a bandwidth used calculation section 14. Or alternatively, in order to observe an amount of data passing per unit time, as shown in FIG. 5, the traffic observation section 1 comprises a timer 12 and a number of packets arrived counter 15. Or alternatively, in order to observe the packet delay time per unit time, as shown in FIG. 6, the traffic observation section 1 comprises a timer 12, a packet delay measurement section 16, and a statistical processing section 17.

It is also possible to implement the nodes which are utilized in these preferred embodiments of the present invention by a computer device, which is an information processing device.

That is to say, by installing the program of this preferred embodiment upon a computer device, as a function which corresponds to the router A of the fifth preferred embodiment of the present invention shown in FIG. 15, it is possible: to implement a function which corresponds to the path establishment section 5A of setting the switch processing by applying, as the type of switch processing, either by IP address-based packet switching or wavelength-based path switching to a single path between the current node and the arrival side node; to implement a function which corresponds to the traffic observation section 1; and to implement, as a function which corresponds to the path establishment section 5A, a function of selecting one or the other of the types of switch processing according to the results of observation by the traffic observation section 1; and thereby to cause this computer device to function as a device which corresponds to the router A of the fifth preferred embodiment of the present invention.

Furthermore, by installing the program of this preferred embodiment upon a computer device, as a function which corresponds to the router C of the sixth preferred embodiment of the present invention shown in FIG. 19, it is possible to implement: a function which corresponds to the traffic observation section 1; and a function, which corresponds to the path change request setting section 8A, of notifying the results of observation by the traffic observation section 1 to the dispatch side node; and thereby to cause this computer device to function as a device which corresponds to the router C of the sixth preferred embodiment of the present invention.

Furthermore, by installing the program of this preferred embodiment upon a computer device, as a function which corresponds to the router A of the sixth preferred embodiment of the present invention shown in FIG. 20, it is possible: to implement a function which corresponds to the path establishment section 5A of setting the switch processing by applying, as the type of switch processing, either by IP address-based packet switching or wavelength-based path switching to a single path between the current node and the arrival side node; to implement a function, corresponding to the path change request reception section 7A, the path calculation section 3A, and the path establishment section 5A, of selecting one or the other type of the switch processing according to the results of traffic observation which are included in notifications from other nodes; and thereby to cause this computer device to function as a device which corresponds to the router A of the sixth preferred embodiment of the present invention.

Furthermore, by installing the program of this preferred embodiment upon a computer device, as shown in FIGS. 22, 23, and 24, it is possible: to implement a function which corresponds to the traffic observation section 1; to implement a function which corresponds to the flooding section 10A of advertising the results of observation by this traffic observation section 1 to the other nodes; and to implement a function which corresponds to the path establishment section 5A of applying, as the type of switch processing, either by IP address-based packet switching or wavelength-based path switching to a single path between the dispatch side node and the arrival side node, and, when the current node is the dispatch side node, selecting one or the other of the types of switch processing according to the results of observation which are included in the advertisements from the flooding section 10A; and thereby to cause this computer device to function as a device which corresponds to the routers A, E, and F, the optical cross-connects B, D, and G, and the optical router C of the eighth preferred embodiment of the present invention. As a function which corresponds to the flooding section 10A, it is possible to implement a function of writing the results of observation into a portion of the link information for OSPF.

As a function which corresponds to the path establishment section 5A, it is possible to implement a function of, when the switch processing is IP address-based packet switching, and the results of observation exceed a certain threshold value, changing the switch processing to wavelength-based path switching.

Furthermore, as a function which corresponds to the traffic observation section 1 shown in FIG. 4, in order to observe the amount of data which passes per unit time, functions may be implemented which correspond to the packet length summation section 13 and the bandwidth used calculation section 14.

Or alternatively, as a function which corresponds to the traffic observation section 1 shown in FIG. 5, in order to observe the number of packets passing per unit time, functions may be implemented which correspond to the number of packets arrived counter 15.

Or alternatively, as a function which corresponds to the traffic observation section 1 shown in FIG. 6, in order to observe the packet delay time, functions may be implemented which correspond to the packet delay measurement section 16, and the statistical processing section 17.

By recording the program of any of these preferred embodiments of the present invention upon a recording medium, it is possible to install this program according to the preferred embodiment upon a computer device by using this recording medium. Or, it is also possible to install this program according to any of these preferred embodiments directly upon a computer device via a network from a server upon which this program according to the preferred embodiment is stored.

By doing this, it is possible to implement a packet communication network and a node which are capable of efficiently taking advantage of network resources by automatically, via a computer device, selecting a path which reflects the actual state of use of the electrical path or the optical path.

In the following, these preferred embodiments of the present invention will be further described in detail.

Embodiment 5

In this fifth preferred embodiment, a method is employed in which a router A, which is a node which changes the setting of an electrical path or an optical path, performs the traffic observation, and requests the change of the setting of the electrical path or the optical path based upon this information.

As shown in FIG. 12, routers A, E, and F and an optical router C are comprised in the traffic observation section 1. In FIGS. 13A through 13B, traffic for the electrical path which is established between the router A and the router F is observed by the router A. The electrical path between the router A and the router F uses an optical path between A and C and an optical path between C and F.

The reason why the electrical path between A and F passes via the optical router C will now be described. The optical path is a single wavelength, and its speed is, for example, 10 Gbits/sec. If the bandwidth used by the electrical path between A and F is low, it is not possible to use the optical paths at good efficiency if an optical path is directly established between A and F. In contrast, it is possible to use the optical path between C and F efficiently by bundling together the traffic from other grounds towards the router F which passes through the optical router C, and the traffic upon the electrical path between A and F, and by accommodating the combination in the optical path between C and F.

However, in this case the optical router C is used for a packet switching function, and accordingly its cost rises to a certain extent. If the amount of traffic between grounds is low, then the optical path is utilized efficiently by bundling together all the traffic which must utilize the packet switching function at the relay node, while if the traffic from the grounds becomes high, then it is generally desirable to connect the grounds together directly with an optical path, by using the wavelength path switching function, without utilizing the packet switching function in the relay node.

For example, if the bandwidth used for the electrical path has exceeded a threshold value, the router A newly establishes an optical path (a cut through path) directly between the router A and the router F, and the electrical path between A and F is accommodated in this newly established optical path. In the example shown in FIG. 13B, the newly established optical path follows the path A->B->C->D->F. In the example shown in FIG. 14B, the newly established optical path follows the path A->B->G->D->F.

The router A according to this fifth preferred embodiment shown in FIG. 15 comprises a traffic observation section 1 and a routing control section 6A-1. The traffic observation section 1 collects straffic information for each of the links. This traffic information which must be observed may be amount of data per unit time (bandwidth used), number of packets passing per unit time, in-node packet delay time, or the like. Threshold values are set in advance by the routing control section 6A-1 into a threshold value determination section 2A, and, if an observed value has exceeded the threshold value, this is taken as a trigger for changing the path setting. A path establishment section 5A establishes an electrical path or an optical path. Optical cross-connects B, D, and G or an optical router C function in the same manner as well, and, as shown in FIGS. 16 and 17, receive the path establishment signals and perform establishment processing in the case of a path (an electrical path or an optical path) which involves the current node. This path establishment signal is transmitted all the way to the final router.

The case in which the bandwidth used is employed as the traffic information will now be discussed. It is possible to calculate the bandwidth not used by calculating the difference between the capacity of the link and the bandwidth used. The shortest path from the current node to each arrival node is selected by taking the reciprocal of the bandwidth not used as the distance of the link. Based upon, this result, the destination of the current hop is determined, and is reflected in the routing table. This method is one which aims at a result of minimizing the end-to-end packet forwarding delay time.

The case in which the number of packets passing per unit time is employed as the traffic information will now be discussed. The above described method can be followed by roughly calculating the bandwidth used by dividing the number of packets by the average packet length, since it is possible to predict the average packet length from the network activity situation.

The case in which the in-node delay time is employed as the traffic information will now be discussed. The packet delay between nodes is fixed since there is no queuing between the nodes. Accordingly, the shortest path from the current node to each arrival node is selected by taking the sum of the in-node delay time and the delay times between the nodes as the distance of the link. Based upon this result, the destination of the current hop is determined, and is reflected in the routing table. This method is, again, one which attempts to attain the result of minimizing the end-to-end delay time for packet forwarding.

The above described method for path calculation using traffic information is given as an example; it is possible to employ various different methods. It is possible to utilize network resources with high efficiency, since in this manner the electrical path or optical path is established by using the traffic information which has been obtained by observing the actual traffic.

Embodiment 6

In the fifth preferred embodiment, a method was employed in which a router A, which was a node which changed the setting of an electrical path or an optical path, performed observation of the traffic, and requested the changeover of the setting of the electrical path or the optical path based upon the traffic information. However, in the sixth preferred embodiment of the present invention, a method is employed in which an optical router C, which is a relay node, performs observation of the traffic, and notifies the traffic information to a router A which is a node which changes over the setting of an electrical path or an optical path; and this router A which has been notified requests the changing over of the setting of the electrical path or the optical path.

As shown in FIGS. 18A and 18B, the optical router C observes the traffic which flows through an optical path between the nodes C and F (i.e., the traffic upon an electrical path which is accommodated in the optical path between C and F).

As shown in FIG. 19, if the result of observation of the traffic exceeds a certain threshold value, a request signal for path change is notified to the router A, which is the starting point for this electrical path which is accommodated. As shown in FIG. 20, the router A receives this request signal for path change in a path change request reception section 7A thereof, and establishes an electrical path or an optical path in the same way as in the fifth preferred embodiment, described above.

Embodiment 7

In this seventh preferred embodiment of the present invention, an example is disclosed of measuring, in the nodes, the amount of data per unit time (the bandwidth used), the number of packets passing per unit time, the in-node packet delay time, which is the traffic information which was described in the above explanation of the fifth preferred embodiment.

FIG. 4 shows the traffic observation section 1 of this seventh preferred embodiment for the bandwidth used case. The packet lengths for those packets which have passed in unit time are added together by using a timer 12 and a packet length summation section 13, and the bandwidth used is calculated from the results thereof by a bandwidth used calculation section 14. The bandwidth used is expressed in, for example, Mbits/sec.

FIG. 5 shows the traffic observation section 1 in this seventh preferred embodiment for the number of packets passing case. The number of packets passing per unit time is measured using a timer 12 and a number of packets arrived counter 15. The number of packets passing is expressed in, for example, packets/sec.

FIG. 6 shows the traffic observation section 1 in this seventh preferred embodiment for the in-node delay case. Here, it is assumed that an output queue 19 generates the in-node delay. A packet delay measurement section 16 measures the time instant of the arrival of a packet and the time instant of the output of a packet, and takes the difference between these as the in-node delay time for that packet. A time period is set by a timer 12, over which a statistical processing section 17 should perform statistical processing, for example, by calculating the average of the in-node delay times for each packet in the time period, and taking the average as the delay time in the node.

Embodiment 8

In the eighth preferred embodiment of the present invention, a method is employed in which each of the routers A, E, and F and the optical router C comprises a traffic observation section 1 as shown in FIG. 21, and the link state is advertised by flooding by the flooding section 10A, and a link state database 4A which is included in each of the routers A, E, and F and the optical router C is updated with the traffic information.

Each of the routing control sections 6A-4 and 9A-4 in each of the routers A, E, and F and the optical router C comprises a link state database 4A, a flooding section 10A, a path calculation section 3A, a path establishment section 5A, and a threshold value determination section 2A.

The traffic observation section 1 collects the traffic information for each link. This traffic information which must be observed may be the amount of data per unit time (the bandwidth used), the number of packets passing per unit time, the in-node packet delay time, or the like.

The traffic information which is observed is reflected in the link state database 4A. This is achieved by a method of updating the link state database 4A by adding traffic information to the OSPF link state information and then advertising the link state by flooding by the flooding section 10A.

In this flooding process, if a packet which has been forwarded from some node and has arrived at the current node is the first occurrence of this particular packet which has been received, it is transmitted to the other nodes that are connected to the current node, at the same time it is taken in by the current node, while on the other hand, if it is a packet which has already been forwarded and received previously, then it is discarded, since it is one which has returned around a loop.

The threshold value determination section 2A monitors the traffic information in the link state database 4A, and, if this traffic information exceeds some threshold value, then it takes this as a trigger for flooding this traffic information. Furthermore, the threshold value determination section 2A monitors the traffic information in the link state database 4A, and, if this traffic information exceeds some threshold value, then it takes this as a trigger for performing path calculation by the path calculation section 3A, and also performs path setting change by the path establishment section 5A.

What is claimed is:

1. A node comprising:
a link state information advertisement section which advertises to other nodes link state information which indicates the state of links which are connected to a current node;
an establishment section which establishes a packet forwarding path according to the link state information which is included in an advertisement from the link state information advertisement section;
a traffic observation section which observes traffic of the links and outputs the results of traffic observation;
a traffic observation result advertisement section which advertises the results of the traffic observation from the traffic observation section to other nodes, and
a setting section which sets switch processing either by IP address-based packet switching or wavelength-based path switching which is applied to one path between the current node and an arrival side node
wherein the setting section comprises a selection section which alternately selects either (a) IP address-based packet switching or (b) wavelength-based path switching according to the results of the traffic observation from the traffic observation section.

2. The node according to claim 1, wherein the link state information advertisement section comprises a section for appending the results of the traffic observation which have been observed by the traffic observation section to the link state information, and
wherein the establishment section which establishes the packet forwarding path comprises:
a calculation section which calculates a dynamic link cost based on traffic information which is included in the advertisement from the link state information advertisement section; and
a section which calculates a path according to the dynamic link cost which has been calculated by the calculation section.

3. The node according to claim 2, wherein the link state information includes path capacity and reserved bandwidth and a fixed link cost which is given in advance for the path, and
wherein the calculation section which calculates the dynamic link cost comprises a section which calculates the dynamic link cost according to the path capacity and the reserved bandwidth and the fixed link cost which is given in advance for the path which are included in the link state information, and the traffic information.

4. The node according to claim 2, wherein the traffic observation section comprises a section which observes amount of data which passes per unit time.

5. The node according to claim 2, wherein the traffic observation section comprises a section which observes number of packets passing per unit time.

6. The node according to claim 2, wherein the traffic observation section comprises a section which observes packet delay time per unit time.

7. The node according to claim 1, wherein the traffic observation section comprises a section which transmits the results of the traffic observation to a traffic information collection and distribution section which collects the results of the traffic observation from each node and distributes the results of the traffic observation to predetermined nodes, and
wherein the establishment section which establishes the packet forwarding path comprises:
a calculation section which calculates a dynamic link cost based on traffic information which has been distributed by the traffic information collection and distribution section; and
a section which calculates a path according to the dynamic link cost which has been calculated by the calculation section.

8. The node according to claim 7, wherein the link state information includes path capacity, reserved bandwidth and a fixed link cost which is given in advance for the path, and
wherein the calculation section which calculates the dynamic link cost comprises a section which calculates the dynamic link cost according to the path capacity and the reserved bandwidth and the fixed link cost which is given in advance for the path which are included in the link state information, and the traffic information.

9. The node according to claim 7, wherein the traffic observation section comprises a section which observes amount of data which passes per unit time.

10. The node according to claim 7, wherein the traffic observation section comprises a section which observes number of packets passing per unit time.

11. The node according to claim 7, wherein the traffic observation section comprises a section which observes packet delay time per unit time.

12. The node according to claim 1, wherein the traffic observation section comprises a section which observes amount of data which passes per unit time.

13. The node according to claim 1, wherein the traffic observation section comprises a section which observes number of packets passing per unit time.

14. The node according to claim 1, wherein the traffic observation section comprises a section which observes packet delay time per unit time.

15. The node according to claim 1, wherein the selection section comprises a section which changes over the switch processing to wavelength-based path switching, if the switch processing is IP address-based packet switching when the results of the traffic observation have exceeded a threshold value.

16. The node according to claim 1, wherein the traffic observation section comprises a section which observes amount of data which passes per unit time.

17. The node according to claim 1, wherein the traffic observation section comprises a section which observes number of packets passing per unit time.

18. The node according to claim 1, wherein the traffic observation section comprises a section which observes packet delay time per unit time.

19. The node according to claim 1, wherein the node is provided upon a path between a dispatch side node and an arrival side node, and
wherein the node further comprises a section which notifies the results of the traffic observation from the traffic observation section to the dispatch side node.

20. The node according to claim 19, wherein the traffic observation section comprises a section which observes amount of data which passes per unit time.

21. The node according to claim 19, wherein the traffic observation section comprises a section which observes number of packets passing per unit time.

22. The node according to claim 19, wherein the traffic observation section comprises a section which observes packet delay time per unit time.

23. A node comprising:
a link state information advertisement section which advertises to other nodes link state information which indicates the state of links which are connected to a current node;
an establishment section which establishes a packet forwarding path according to the link state information which is included in an advertisement from the link state information advertisement section;
a traffic observation section which observes traffic of the links and outputs the results of traffic observation; and
a traffic observation result advertisement section which advertises the results of the traffic observation from the traffic observation section to other nodes,
wherein switch processing either by IP address-based packet switching or wavelength-based path switching is applied to one path between the current node and an arrival side node, and
wherein the node further comprises a setting section which sets the switch processing, and
wherein the setting section comprises a selection section which alternately selects either (a) IP address-based packet switching or (b) wavelength-based path switching according to the results of the traffic observation included in notifications from other nodes.

24. The node according to claim 23, wherein the selection section comprises a section which changes over the switch processing to wavelength-based path switching, if the switch processing is IP address-based packet switching when the results of the traffic observation have exceeded a threshold value.

25. A node comprising:
a link state information advertisement section which advertises to other nodes link state information which indicates the state of links which are connected to the current node;
an establishment section which establishes a packet forwarding path according to the link state information which is included in an advertisement from the link state information advertisement section;
a traffic observation section which observes traffic of the links and outputs the results of traffic observation; and
a traffic observation result advertisement section which advertises the results of the traffic observation from the traffic observation section to other nodes,
wherein switch processing either by IP address-based packet switching or wavelength-based path switching is applied to one path between a dispatch side node and an arrival side node, and
wherein the node further comprises a selection section which alternately selects either (a) IP address-based packet switching or (b) wavelength-based path switching according to the results of the traffic observation which are included in the advertisement from the traffic observation result advertisement section, when the current node is the dispatch side node.

26. The node according to claim 25, wherein the traffic observation result advertisement section comprises a section which writes the results of the traffic observation into a portion of link information for OSPF (Open Shortest Path First).

27. The node according to claim 25, wherein the selection section comprises a section which changes over the switch processing to wavelength-based path switching, if the switch processing is IP address-based packet switching when the results of the traffic observation have exceeded a threshold value.

28. The node according to claim 25, wherein the traffic observation section comprises a section which observes amount of data which passes per unit time.

29. The node according to claim 25, wherein the traffic observation section comprises a section which observes number of packets passing per unit time.

30. The node according to claim 25, wherein the traffic observation section comprises a section which observes packet delay time per unit time.

31. A packet communication network comprising:
a first node which performs IP address-based packet switching;
a second node which performs wavelength-based path switching; and
a third node performs both IP address-based packet switching and wavelength-based path switching,
wherein the first node, the second node, and the third node further comprise: a link state information advertisement section which advertises link state information which indicates the state of links which are connected to the current node, to other nodes, an establishment section which establishes a packet forwarding path according to the link state information which is included in an advertisement from the link state information advertisement section;
a traffic observation section which observes traffic of the links and outputs the results of traffic observation; and a traffic observation result advertisement section which advertises the results of the traffic observation from the traffic observation section to other nodes,
wherein a relay node, which is the second node or the third node, is provided between a dispatch side node, which is the first node or the third node, and an arrival side node, which is the first node or the third node, and
wherein switch processing either by IP-address-based packet switching or wavelength-based path switching is applied to one path between the dispatch side node and the arrival side node, and
wherein the dispatch side node comprises a setting section which sets the switch processing, and
wherein the setting section comprises a selection section which selects one or the other of the types of the switch processing according to the results of the traffic observation from the traffic observation section.

32. The packet communication network according to claim 31, wherein the link state information advertisement section comprises a section which appends the results of the traffic observation which have been observed by the traffic observation section to the link state information, and
wherein the establishment section which establishes the packet forwarding path comprises:
a calculation section which calculates a dynamic link cost based on traffic information which is included in the advertisement from the link state information advertisement section; and
a section which calculates a path according to the dynamic link cost which has been calculated by the calculation section.

33. The packet communication network according to claim 32, wherein the link state information includes path capacity, reserved bandwidth, and a fixed link cost which is given in advance for the path, and wherein the calculation section which calculates the dynamic link cost comprises a section which calculates the dynamic link cost according to the path capacity and the reserved bandwidth and the fixed link cost which is given in advance for the path which are included in the link state information, and the traffic information.

34. The packet communication network according to claim 32, wherein the traffic observation section comprises a section which observes amount of data which passes per unit time.

35. The packet communication network according to claim 32, wherein the traffic observation section comprises a section which observes number of packets passing per unit time.

36. The packet communication network according to claim 32, wherein the traffic observation section comprises a section which observes packet delay time per unit time.

37. The packet communication network according to claim 31, further comprising a traffic information collection and distribution section which collects the results of the traffic observation from each node and distributes the results of the traffic observation to predetermined nodes, and wherein the traffic observation section comprises a section which transmits the results of the traffic observation to the traffic information collection and distribution section, and wherein the establishment section which establishes the packet forwarding path comprises:

a calculation section which calculates a dynamic link cost according to traffic information which has been distributed by the traffic information collection and distribution section; and a section which calculates a path according to the dynamic link cost which has been calculated by the calculation section.

38. The packet communication network according to claim 37, wherein the link state information includes path capacity, reserved bandwidth, and a fixed link cost which is given in advance for the path, and wherein the calculation section which calculates the dynamic link cost comprises a section which calculates the dynamic link cost according to the path capacity and the reserved bandwidth and the fixed link cost which is given in advance for the path which are included in the link state information, and the traffic information.

39. The packet communication network according to claim 37, wherein the traffic observation section comprises a section which observes amount of data which passes per unit time.

40. The packet communication network according to claim 37, wherein the traffic observation section comprises a section which observes number of packets passing per unit time.

41. The packet communication network according to claim 37, wherein the traffic observation section comprises a section which observes packet delay time per unit time.

42. The packet communication network according to claim 31, wherein the selection section comprises a section which changes over the switch processing to wavelength-based path switching, if the switch processing is IP address-based packet switching when the results of the traffic observation have exceeded a threshold value.

43. The packet communication network according to claim 31, wherein the traffic observation section comprises a section which observes amount of data which passes per unit time.

44. The packet communication network according to claim 31, wherein the traffic observation section comprises a section which observes number of packets passing per unit time.

45. The packet communication network according to claim 31, wherein the traffic observation section comprises a section which observes packet delay time per unit time.

46. A packet communication network comprising:

a first node which performs IP address-based packet switching;

a second unit which performs wavelength-based path switching; and a third node which performs both IP address-based packet switching and wavelength-based path switching, wherein the first node, the second node, and the third node further comprise: a link state information advertisement section which advertises link state information which indicates the state of links which are connected to the current node, to other nodes; an establishment section which establishes a packet forwarding path according to the link state information which is included in an advertisement from the link state information advertisement section; a traffic observation section which observes traffic of the links and outputs the results of traffic observation; and a traffic observation result advertisement section which advertises the results of the traffic observation from the traffic observation section to other nodes, wherein a relay node which is the second node or the third node is provided between a dispatch side node which is the first node or the third node, and an arrival side node which is the first node or the third node, and wherein switch processing either by IP address-based packet switching or wavelength-based path switching is applied to one path between the dispatch side node and the arrival side node, and wherein the dispatch side node comprises a setting section which sets the switch processing, and wherein the relay node comprises the traffic observation section and a notification section which notifies the results of the traffic observation from the traffic observation section to the dispatch side node, and wherein the setting section comprises a selection section which selects one or the other of the types of the switch processing according to the results of the traffic observation which are included in notifications from the notification section.

47. The packet communication network according to claim 46, wherein the selection section comprises a section which changes over the switch processing to wavelength-based path switching, if the switch processing is IP address-based packet switching when the results of the traffic observation have exceeded a threshold value.

48. The packet communication network according to claim 46, wherein the traffic observation section comprises a section which observes amount of data which passes per unit time.

49. The packet communication network according to claim 46, wherein the traffic observation section comprises a section which observes number of packets passing per unit time.

50. The packet communication network according to claim 46, wherein the traffic observation section comprises a section which observes packet delay time per unit time.

51. A packet communication network comprising:
- a first node which performs IP address-based packet switching;
- a second node which performs wavelength-based path switching; and
- a third node which performs both IP address-based packet switching and wavelength-based path switching,
- wherein the first node, the second node, and the third node further comprise: a link state information advertisement section which advertises link state information which indicates the state of links which are connected to the current node, to other nodes; an establishment section which establishes a packet forwarding path according to the link state information which is included in an advertisement from the link state information advertisement section; a traffic observation section which observes traffic of the links and outputs the results of traffic observation; and traffic observation result advertisement section which advertises the results of the traffic observation from the traffic observation section to other nodes
- wherein a relay node which is the second node or the third node is provided between a dispatch side node which is the first node or the third node, and an arrival side node which is the first node or the third node, and
- wherein switch processing either by IP address-based packet switching or wavelength-based path switching is applied to one path between the dispatch side node and the arrival side node, and
- wherein the dispatch side node comprises a setting section which sets the switch processing, and
- wherein each of the dispatch side node, the relay node, and the arrival side node comprises the traffic observation section and the traffic observation result advertisement section, and
- wherein the setting section comprises a selection section which selects one or the other of the types of the switch processing according to the results of the traffic observation which are included in the advertisement from the traffic observation result advertisement section.

52. The packet communication network according to claim 51, wherein the traffic observation result advertisement section comprises a section which writes the results of the traffic observation into a portion of link information for OSPF (Open Shortest Path First).

53. The packet communication network according to claim 51, wherein the selection section comprises a section which changes over the switch processing to wavelength-based path switching, if the switch processing is IP address-based packet switching when the results of the traffic observation have exceeded a threshold value.

54. The packet communication network according to claim 51, wherein the traffic observation section comprises a section which observes amount of data which passes per unit time.

55. The packet communication network according to claim 51, wherein the traffic observation section comprises a section which observes number of packets passing per unit time.

56. The packet communication network according to claim 51, wherein the traffic observation section comprises a section which observes packet delay time per unit time.

57. A packet communication method comprising the steps of:
- disposing a first node which performs IP address-based packet switching, a second node which performs wavelength-based path switching, and a third node which performs both IP address-based packet switching and wavelength-based path switching, in a packet communication network;
- providing a relay node, which is the second node or the third node, between a dispatch side node, which is the first node or the third node, and an arrival side node, which is the first node, or the third node;
- at each node which is provided upon a packet communication network, advertising an advertisement containing link state information which indicates the state of links which are connected to the current node to other nodes;
- establishing a packet forwarding path according to the link state information contained in the advertisement;
- observing traffic of the links and outputting the results of traffic observation;
- advertising the results of traffic observation to other nodes;
- at the dispatch side node, setting switch processing either by IP address-based packet switching or wavelength-based path switching for one path between the dispatch side node and the arrival side node; and
- selecting one or the other of the types of the switch processing according to the results of the traffic observation from the dispatch side node.

58. The packet communication method according to claim 57, wherein, at each node: the results of the traffic observation are appended to the link state information; a dynamic link cost is calculated according to traffic information which is contained in the advertisement; and a path is calculated according to the dynamic link cost which has been calculated.

59. The packet communication method according to claim 57, wherein the link state information includes path capacity, reserved bandwidth, and a fixed link cost which is given in advance for the path, and the dynamic link cost is calculated according to the path capacity and the reserved bandwidth and the fixed link cost which is given in advance for the path which are included in the link state information, and the traffic information.

60. The packet communication method according to claim 57, wherein, in each node, the results of the traffic observation are transmitted to a traffic information collection and distribution section which collects the results of the traffic observation for each node and distributes the results of the traffic observation to predetermined nodes, a dynamic link cost is calculated based on traffic information which is distributed by the traffic information collection and distribution section, and a path is calculated according to the dynamic link cost which has been calculated.

61. The packet communication method according to claim 60, wherein the link state information includes path capacity, reserved bandwidth, and a fixed link cost which is given in advance for the path; and the dynamic link cost is calculated according to the path capacity and the reserved bandwidth and the fixed link cost which is given in advance for the path which are included in the link state information, and the traffic information.

62. A packet communication method comprising the steps of:
- disposing a first node which performs IP address-based packet switching, a second node which performs wavelength-based path switching, and a third node which performs both IP address-based packet switching and wavelength-based path switching in the packet communication network
- providing a relay node which is the second node or the third node between a dispatch side node, which is the first node or the third node, and an arrival side node which is the first node or the third node;

at each node which is provided upon a packet communication network, advertising to other nodes an advertisement containing link state information which indicates the state of links which are connected to a current node;

establishing a packet forwarding path according to the link state information contained in the advertisement;

observing traffic of the links and outputting the results of traffic observation;

advertising the results of traffic observation to other nodes;

at the dispatch side node, setting switch processing either by IP address-based packet switching or wavelength-based path switching for one path between the dispatch side node and the arrival side node;

at the relay node, observing traffic and notifies the results of traffic observation to the dispatch side node; and at the dispatch side node, selecting one or the other of the types of the switch processing according to notification.

63. A packet communication method comprising the steps of:

disposing a first node which performs IP address-based packet switching, a second node which performs wavelength-based path switching, and a third node which performs both IP address-based packet switching and wavelength-based path switching in the packet communication network, providing a relay node, which is the second node or the third node between a dispatch side node, which is the first node or the third node, and an arrival side node which is the first node or the third node, at each node which is provided upon a packet communication network, advertising an advertisement containing link state information which indicates the state of links which are connected to the current node, to other nodes;

establishing a packet forwarding path according to the link state information contained in the advertisement;

observing traffic of the links and outputting the results of traffic observations;

advertising the results of traffic observation to other nodes;

at the dispatch side node, setting switch processing either by IP address-based packet switching or wavelength-based path switching for one path between the dispatch side node and the arrival side node;

at the dispatch side node, the relay node, and the arrival side node, observing traffic and advertising the results of traffic observation are advertised to the other nodes; and at the dispatch side node, selecting one or the other of the types of the switch processing according to an advertisement containing the results of the traffic observation.

64. A computer-recording medium encoded with a program installed upon an information processing device which causes the information processing device, as a function which corresponds to a node which is disposed within a packet communication network, to implement:

a link state information advertisement function of advertising link state information which indicates the states of links which are connected to the current node, to other nodes;

an establishment function of establishing a packet forwarding path according to the link state information which is included in an advertisement from the link state information advertisement function;

a traffic observation function of performing traffic observation for the links and outputting the results of the traffic observation;

a traffic observation result advertisement function of advertising the results of the traffic observation from the traffic observation function to other nodes; and a setting function of setting switch processing either by IP address-based packet switching or wavelength-based path switching which is applied to one path between the current node and an arrival side node, the setting function including a function of selecting one or the other of the types of the switch processing according to the results of the traffic observation from the traffic observation function.

65. The computer-recording medium encoded with the program according to claim 64, wherein, as the link state information advertisement function, a function is implemented of appending the results of the traffic observation which have been observed by the traffic observation function to the link state information, and wherein, as the establishment function of establishing the packet forwarding path, there are implemented: a calculation function of calculating a dynamic link cost according to traffic information which is included in the advertisement from the link state information advertisement function; and a function of calculating a path according to the dynamic link cost which has been calculated by the calculation function.

66. The computer-recording medium encoded with the program according to claim 64, wherein, as the traffic observation function, a transmission function is implemented of transmitting the results of the traffic observation to a traffic information collection and distribution function which collects the results of the traffic observation from each node, and distributes the results of the traffic observation to predetermined nodes, and wherein, as the establishment function of establishing the packet forwarding path, there are implemented: a calculation function of calculating a dynamic link cost according to traffic information which is distributed by the traffic information collection and distribution function; and a function of calculating a path according to the dynamic link cost which has been calculated by the calculation function.

67. The computer-recording medium encoded with the program according to claim 64, wherein, as a function corresponding to nodes which are disposed in the packet communication network, a function is implemented of notifying the results of the traffic observation from the traffic observation function to a dispatch side node.

68. A computer-recording medium encoded with a program installed upon an information processing device which causes the information processing device, as a function which corresponds to a node which is disposed within a packet communication network, to implement:

a link state information advertisement function of advertising link state information which indicates the states of links which are connected to the current node, to other nodes;

an establishment function of establishing a packet forwarding path according to the link state information which is included in an advertisement from the link state information advertisement function;

a traffic observation function of performing traffic observation for the links and outputting the results of the traffic observation;

a traffic observation result advertisement function of advertising the results of the traffic observation from the traffic observation function to other nodes; and a setting function of setting switch processing either by IP address-based packet switching or wavelength-based path switching which is applied to one path between the current node and an arrival side node, the setting function including a function of alternately selecting either (a) IP address-based packet switching or (b) wavelength-based path switching according to the results of the traffic observation which are included in notifications from other nodes.

69. A computer-recording medium encoded with a program installed upon an information processing device which causes the information processing device, as a function which corresponds to a node which is disposed within a packet communication network, to implement:

a link state information advertisement function of advertising link state information which indicates the states of links which are connected to the current node, to other nodes;

an establishment function of establishing a packet forwarding path according to the link state information which is included in an advertisement from the link state information advertisement function;

a traffic observation function of performing traffic observation for the links and outputting the results of the traffic observation;

a traffic observation result advertisement function of advertising the results of the traffic observation from the traffic observation function to other nodes; and a function of alternately selecting one or the other of the types of switch processing either by IP address-based packet switching or wavelength-based path switching which is applied to one path between a dispatch node and an arrival side node, according to the results of the traffic observation which are included in the advertisement from the traffic observation result advertisement function, when the current node is the dispatch side node.

* * * * *